(12) United States Patent
Silbert

(10) Patent No.: US 12,442,830 B2
(45) Date of Patent: Oct. 14, 2025

(54) SYSTEMS FOR DIFFERENTIAL MEASUREMENT OF A FLUID LEVEL IN A SAMPLE RECEPTACLE

(71) Applicant: GEN-PROBE INCORPORATED, San Diego, CA (US)

(72) Inventor: Rolf Silbert, Del Mar, CA (US)

(73) Assignee: GEN-PROBE INCORPORATED, San Diego, CA (US)

( * ) Notice: Subject to any disclaimer, the term of this patent is extended or adjusted under 35 U.S.C. 154(b) by 320 days.

(21) Appl. No.: 17/996,923

(22) PCT Filed: Apr. 22, 2021

(86) PCT No.: PCT/US2021/028719
§ 371 (c)(1),
(2) Date: Oct. 21, 2022

(87) PCT Pub. No.: WO2021/216929
PCT Pub. Date: Oct. 28, 2021

(65) Prior Publication Data
US 2023/0176085 A1 Jun. 8, 2023

Related U.S. Application Data

(60) Provisional application No. 63/015,129, filed on Apr. 24, 2020.

(51) Int. Cl.
*G01N 35/10* (2006.01)
*G01N 35/02* (2006.01)
(52) U.S. Cl.
CPC ......... *G01N 35/1009* (2013.01); *G01N 35/02* (2013.01); *G01N 2035/1025* (2013.01)
(58) Field of Classification Search
CPC ............... G01N 35/1009; G01N 35/02; G01N 2035/1025
See application file for complete search history.

(56) References Cited

U.S. PATENT DOCUMENTS 5,827,943 A 10/1998 Schmidt
6,142,015 A 11/2000 Getman et al.
(Continued)

FOREIGN PATENT DOCUMENTS

CN 104006866 A 8/2014
CN 109563457 A 4/2019
(Continued)

OTHER PUBLICATIONS

CIPO Office Action, Canadian Application No. 3,177,253, Jan. 23, 2024.
(Continued)

*Primary Examiner* — Timothy P Graves
(74) *Attorney, Agent, or Firm* — Rothwell, Figg, Ernst & Manbeck, P.C.; Charles B. Cappellari

(57) ABSTRACT

Automated systems and methods determine a level of fluid relative to a rim of a sample receptacle defining an open top of the sample receptacle. The systems and methods utilize a distance sensor to measure the distance between the rim of the sample receptacle and the surface of a fluid sample contained in the sample receptacle, where at least one of the sensor and the sample receptacle is moved relative to the other to enable the sensor to obtain a sequence of discrete measurements of distances between the sensor and the rim of the sample receptacle and between the sensor and the surface of the fluid sample. A controller processes an output signal from the sensor to determine a level of the fluid relative to the rim of the sample receptacle. The derivative of the sequence of discrete measurements may be used to identify the rim and the fluid surface in the output signal.

35 Claims, 10 Drawing Sheets

(56) References Cited

U.S. PATENT DOCUMENTS

| | | | |
|---|---|---|---|
| 6,227,053 | B1 | 5/2001 | Purpura et al. |
| 7,323,705 | B2 | 1/2008 | Haga et al. |
| 7,600,320 | B2 | 10/2009 | Kaimi et al. |
| 7,690,403 | B2 | 4/2010 | You et al. |
| 8,167,004 | B2 | 5/2012 | Lee et al. |
| 9,127,929 | B2 | 9/2015 | Siercks et al. |
| 9,377,479 | B2 | 6/2016 | Burkard |
| 9,534,885 | B2 | 1/2017 | Klinec et al. |
| 10,429,401 | B2 | 10/2019 | Streibl et al. |
| 10,450,144 | B2 | 10/2019 | Vivet et al. |
| 11,709,171 | B2 | 7/2023 | Kopp et al. |
| 2005/0285060 | A1* | 12/2005 | Haga ............ G01F 23/2928 250/577 |
| 2008/0308176 | A1 | 12/2008 | Weems |
| 2013/0125675 | A1 | 5/2013 | Mueller et al. |
| 2014/0305227 | A1 | 10/2014 | Johns |
| 2016/0018427 | A1 | 1/2016 | Streibl et al. |
| 2017/0014964 | A1 | 1/2017 | Neff |
| 2017/0045542 | A1 | 2/2017 | Lapham et al. |
| 2017/0052205 | A1* | 2/2017 | Silbert ............ G01N 35/0099 |
| 2017/0185815 | A1 | 6/2017 | Itoh |
| 2018/0364268 | A1 | 12/2018 | Kluckner et al. |
| 2019/0107430 | A1 | 4/2019 | Luedemann |
| 2019/0378265 | A1 | 12/2019 | Vivet et al. |
| 2020/0195500 | A1 | 6/2020 | Kishen et al. |
| 2020/0256884 | A1 | 8/2020 | Wissmann et al. |
| 2021/0096148 | A1 | 4/2021 | Horie et al. |

FOREIGN PATENT DOCUMENTS

| | | | |
|---|---|---|---|
| CN | 110275032 | A | 9/2019 |
| CN | 110914669 | A | 3/2020 |
| EP | 2776848 | B1 | 12/2019 |
| JP | 1-44820 | B2 | 9/1989 |
| JP | H11-132830 | A | 5/1999 |
| JP | 2000-121413 | A | 4/2000 |
| JP | 2014-202721 | A | 10/2014 |
| JP | 2014-532879 | A | 12/2014 |
| JP | 2017-120206 | A | 7/2017 |
| JP | 2019-510963 | A | 4/2019 |
| WO | 2006063933 | A2 | 6/2006 |
| WO | 2007097456 | A1 | 8/2007 |
| WO | 2008079202 | A1 | 7/2008 |
| WO | 2017074996 | A1 | 5/2017 |
| WO | 2019005744 | A1 | 1/2019 |
| WO | 2019176227 | A1 | 9/2019 |

OTHER PUBLICATIONS

Communication pursuant to Article 94(3) EPC issued for EP Patent Application No. 21724954.9 on Sep. 23, 2024, 9 pages.
PCT International Search Report and Written Opinion, International Application No. PCT/US2021/028719, Jul. 21, 2021.
Notice of Reasons for Rejection issued for Japanese Patent Application No. 2022-564327 on Oct. 24, 2024, 13 pages.
JPO Official Action, Japanese Patent Application No. 2022-564327, Mar. 19, 2025.
IPA Examination Report No. 1, Australian Application No. 2021259791, Jun. 5, 2025.
CNIPA First Office Action, Chinese Application No. 202180042662.3, Aug, 14, 2025.
CNIPA Retrieval Report, Chinese Application No. 202180042662.3, Aug. 12, 2025.

* cited by examiner

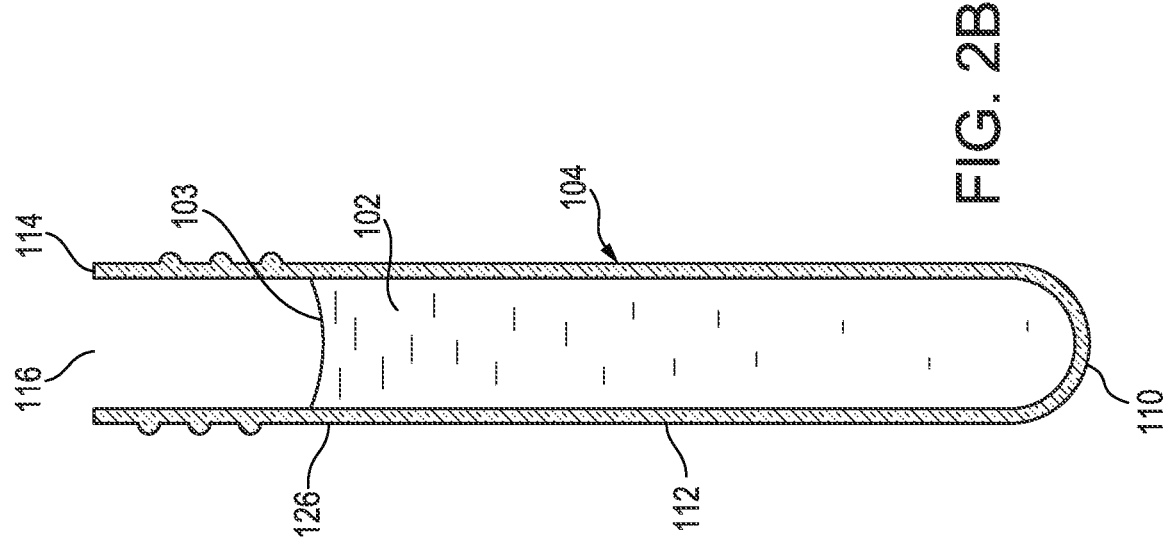
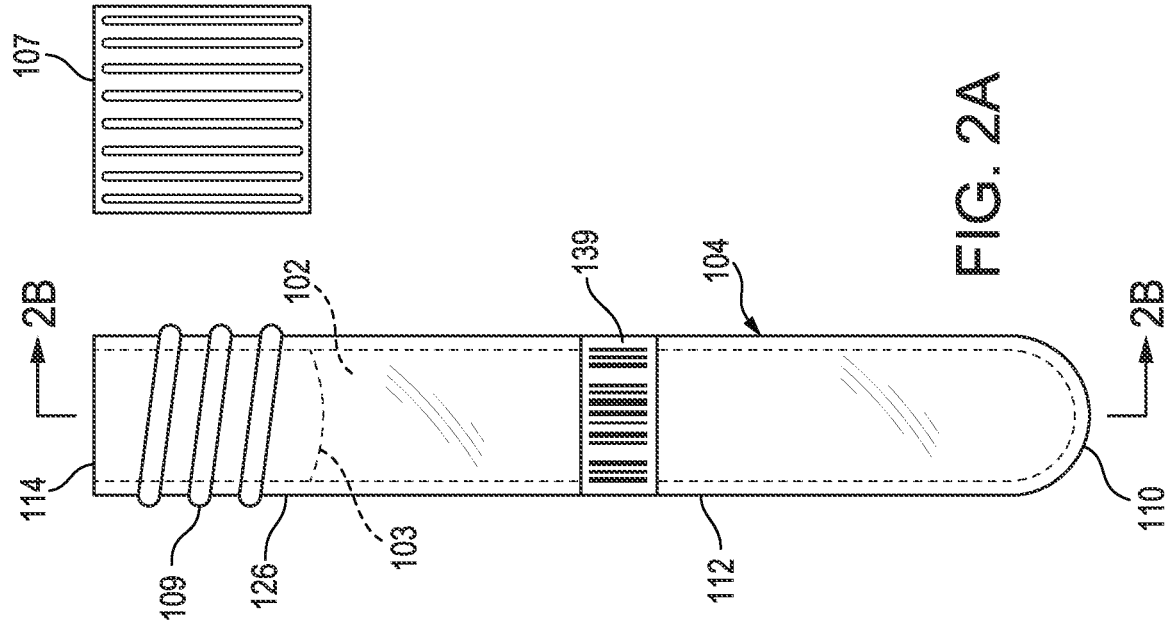

SYSTEMS FOR DIFFERENTIAL MEASUREMENT OF A FLUID LEVEL IN A SAMPLE RECEPTACLE

CROSS REFERENCE OF RELATED APPLICATION

This application is a National Stage of International Application No. PCT/US2021/028719, filed Apr. 22, 2021, which claims the benefit of U.S. Provisional Application No. 63/015,129, filed Apr. 24, 2020, the respective disclosures of which are incorporated herein by reference.

FIELD

This disclosure generally relates to automated analytical systems methods, and more particularly, to automated systems and methods for measuring differential fluid level in a sample tube.

BACKGROUND

Automated analysis systems for handling and analyzing various types of fluid samples (also referred to as fluid specimens) are widely used in clinical diagnosis and medical research. The fluid samples may be any type of sample or specimen type, such as whole blood, blood serum, blood plasma, interstitial fluid, phlegm, urine, fecal matter, semen, mucus, pus, tissue, food, environmental, industrial, etc. For example, a number of automated systems are available for performing assays on biological fluid samples to detect and/or quantify the presence or amount of antigens, cell abnormalities, disease states, and/or disease-associated pathogens, such as parasites, fungi, bacteria and viruses present in the samples. In general, diagnostic assays are based either on the detection of antigens or antibodies (immunoassays) or nucleic acids belonging to an organism or virus of interest (nucleic acid-based assays). There are also automated systems for performing genetic testing on a biological fluid to identify genes present in a sample, for instance, to detect disease-associated mutations.

Automated analytical systems typically have a variety of stations, which may include sample preparation "prep" stations, analysis stations, storage stations, and/or transport mechanisms, for preparing and analyzing samples contained in sample receptacles. For example, the sample receptacles may be test tubes, vials, or the like. Most, if not all, of the stations typically have associated sample receptacle handling mechanisms (e.g., pick and place robots) and/or fluid handling mechanisms for manipulating the sample receptacles, samples, reagent vessels and reagents, such as robots and fluid-aspirating, and fluid-dispensing devices. The transport mechanisms may include robots, conveyors and other devices for moving the sample receptacles and other materials between the stations. The components of the automated system are controlled by a controller including one or more computerized controllers which control the operation of each of the components in order to integrate and coordinate the components involved in performing one or more assays on a plurality of samples contained in sample receptacles.

While handling sample receptacles by automated analytical systems, it is important that biological fluid samples within the sample receptacles are not spilled or splashed out of the receptacles. Spilling and/or splashing of fluid samples can cause cross-contamination of samples, or contamination of the system itself requiring cleaning and/or other maintenance, which can present a hazard to the personnel operating the systems.

SUMMARY

This disclosure is directed to automated systems and methods for processing a fluid sample contained in a sample receptacle having a rim defining an open top of the sample receptacle. The automated systems and methods measure and determine one or more dimensional aspects of the fluid sample and sample receptacle, including: a level of the fluid contained within the sample receptacle relative to the rim of the sample receptacle; a volume of the fluid sample contained in the sample receptacle; and/or other physical dimensions of the sample receptacle. The level of the fluid contained within the sample receptacle relative to the rim of the sample receptacle may also be referred to as the "headspace" of the fluid sample in the sample receptacle. In other words, "headspace" is the distance between the top surface of the fluid and the rim of the sample receptacle. The headspace may be determined from one or more locations of the top surface of the fluid, or even the entire top surface of the fluid (e.g., a profile).

In general, an automated fluid processing system includes robots, conveyors and/or other electromechanical devices for transporting fluid samples contained in sample receptacles around the system, as well as robots and/or other sample receptacle handling mechanisms for manipulating the sample receptacles within a station of the system (e.g., pick-and-place robots, carriages, etc.). The automated manipulation and transport, and any other movement of a sample receptacle, by an automated analytical system, are collectively referred to as "handling" of the sample receptacle. The automated fluid processing system may utilize sample receptacle holders for holding the sample receptacles while the sample receptacles are handled on the system, or the system may handle the sample receptacles itself, or the system may comprise a combination of handling the sample receptacles within sample receptacle holders and also removing the sample receptacles from their respective holders and directly handling the sample receptacles. The handling of the sample receptacles containing respective fluid samples by the automated system moves the sample receptacles, which causes the fluid samples to move relative to their respective sample receptacles. For example, the acceleration of a sample receptacle, including translation and/or rotation (e.g., tilting), may cause the fluid sample to move within the sample receptacle. If the sample receptacle is filled close to a top rim of the sample receptacle, this movement may cause the fluid sample to splash or spill out of the sample receptacle.

As described above, it is often desirable to prevent spilling and/or splashing of a fluid sample out of a sample receptacle during automated movement of a sample receptacle on an automated fluid sample processing system to prevent cross-contamination of samples, and/or contamination of the system and personnel in the vicinity of the sample. This may be especially true for automated analytical systems, such as diagnostic systems used to perform diagnostic assays and/or genetic testing of patient sample, in which case cross-contamination may potentially result in false positives in diagnosing a patient. While the system and methods disclosed herein are especially useful when implemented on an automated analytical system, the disclosure is not limited to automated analytical systems, but may be utilized with any automated systems and methods for processing fluid samples contained in sample receptacles.

Accordingly, an automated system and method may check the fluid level of a sample receptacle to determine if the fluid level relative to the rim of the sample receptacle is above an acceptable level and quarantine the sample receptacle if the level is too high. However, if a measurement of a level of fluid in a sample receptacle is determined by simply measuring only the surface of the fluid, the tolerance stack of an automated mechanical system for handling sample receptacles, as well as the tolerance of the sample receptacle, may lead to measurement uncertainty of +/−3.5 mm or more. "Tolerance stack" or "stack up" is the combination of tolerances associated with the components of an assembly. In design, the worst-case scenario is usually considered to be the total expected tolerance of a system. In practice, due to statistical variations, the actual tolerance is usually less than the worst-case scenario.

This uncertainty can cause a sample receptacle to be incorrectly measured as having an unacceptable fluid level (e.g., too high and susceptible to spillage, or too low for performing as assay). As a result, the sample receptacle may be unnecessarily quarantined, thereby affecting processing times and overall throughput, as well as imposing an additional burden on laboratory personnel who must remove the receptacle and determine whether it is in fact overfilled.

In one particularly advantageous aspect of this disclosure, the disclosed systems and methods remove the measurement uncertainty caused by the tolerance stack within an automated mechanical system and the sample receptacle. This disclosure eliminates the mechanical tolerance stack by performing an accurate differential measurement in which a sensor measures a distance from a certain point (such as the location of the sensor) to both the fluid surface and to the rim of the sample receptacle, and determining the fluid level relative to the rim based on measurements to both features. In addition, multiple measurements to the fluid surface and the rim may also be obtained, and then filtered and/or averaged, to further refine the measurements before determining the fluid level based on the difference in the measurements.

In one embodiment, the systems and methods of this disclosure are directed to an automated fluid sample processing system which can determine the headspace. In one aspect, the systems and methods can utilize the determined level of the fluid within the sample receptacle to ensure that sample receptacles on the system have respective fluid levels within a predetermined range, or below a predetermined level, to prevent, or at least minimize, spilling and/or splashing of the fluid sample out of the sample receptacle during handling of the sample receptacle on the system. In another aspect, the fluid level may be measured at the outset of processing the sample receptacle by the automated fluid processing system, and the system may be configured to quarantine a sample receptacle which has a fluid level outside of the acceptable range or above the acceptable level such that it would otherwise be at risk of spilling or splashing sample out of the receptacle. In other words, a sample receptacle which is overfilled with fluid sample is immediately quarantined for corrective action before it can potentially contaminate the system.

Accordingly, one embodiment of this disclosure is directed to an automated system for detecting a level of a fluid sample contained in a sample receptacle. The automated system may also be configured to process multiple sample receptacles. The sample receptacle has a closed bottom and a receptacle wall extending from the closed bottom to a rim defining an open top of the sample receptacle. In one aspect, the sample receptacle may be a sample vial, such as a test tube. The sample receptacle may be any other suitable fluid receptacle having an acceptable shape and size.

The system includes a sensor configured for periodically measuring a distance between the sensor and (i) one or more surfaces of the sample receptacle and (ii) a surface of a fluid contained within the sample receptacle. The measurements include measuring a distance between (i) the sensor and the rim of the sample receptacle and (ii) the sensor and the surface of the fluid contained within the sample receptacle. For example, the sensor may be an ultrasound sensor for measuring distance, a laser sensor, or other suitable distance-measuring sensor.

At least one of the sensor and the sample receptacle are controllably movable relative to the other to enable the sensor to obtain a sequence of discrete surface distance measurements between the sensor and the respective surfaces of the sample receptacle and the fluid contained in the sample receptacle. For instance, one or both of the sensor and the sample receptacle holder may be controllably movable to perform a linear scan across the rim of the sample receptacle and the surface of the fluid, thereby permitting the sensor to obtain measurements at different locations on the rim and top surface of the fluid during the scan. In one aspect the linear scan can utilize continuous relative movement while the sensor obtains the measurements, and in another aspect the linear scan can use intermittent relative movement, in which the movement is stopped intermittently for the sensor to obtain measurements.

A controller is operatively coupled with the sensor. The controller is configured to receive and process an output signal from the sensor comprising a digital representation of the sequence of discrete surface distance measurements. The output signal may further comprise sensor positions relative to the sample receptacle, wherein each sensor position is associated with one of the discrete surface distance measurements.

The controller processes the output signal from the sensor to determine the relative level of the fluid contained within the sample receptacle relative to the rim of the sample receptacle, i.e., the headspace.

In another aspect, the sensor is supported by a linear translator that moves the sensor relative to the sample receptacle. Alternatively, the sensor may be fixedly mounted relative to the sample receptacle, in which case the sample receptacle is moved relative to the sensor, such as using the conveyor or other robotic arm to move the sample receptacle.

In another aspect, the sensor is mounted on a vertical linear translator that moves the sensor vertically relative to the sample receptacle. Since the sensor may have limitations on the distance from the measurement surface at which the sensor can measure a distance or at which it is more accurate, the vertical linear translator allows the sensor to be moved to a pre-determined from the rim of the sample receptacle to account for such limitations. This vertical adjustment of the sensor may also allow the automated system to measure the fluid level for different sample receptacles having different heights. For instance, if the sensor is designed to be within a maximum (and/or minimum) distance from the measurement surface, then the vertical linear translator can adjust the vertical position of the sensor to be within the maximum (and/or minimum) distance of the rim of the sample receptacle, and the vertical position can be adjusted based on the height of the sample receptacle. As an example, if sample tubes having heights of 100 mm and 75 mm are utilized, the sensor will be adjusted lower for the 75 mm sample tubes than for the 100 mm sample tubes, since the bottoms of the sample receptacles are seated at the same depth in the recess of their respective sample receptacle holders.

In another feature, the sensor may be disposed at an input station for loading the sample receptacle onto the system. The input station may include a receptacle rack configured to hold a plurality of sample receptacles and a gripper robot configured to remove the sample receptacle from the rack.

In yet another aspect, the automated system may also include a detector configured to determine one or more physical characteristics of the sample receptacle, for instance, a height, a diameter, a shape, and/or the presence or absence of a cap on the sample receptacle. The detector may be any suitable detector, such as a laser or an imaging device.

In still another aspect, the controller may be configured to determine a volume of the fluid contained within the sample receptacle based on at least one of the one or more physical characteristics of the sample receptacle and the level of the fluid contained within the sample receptacle. For instance, the physical characteristics may include a height and diameter of the sample receptacle, such that the controller can determine a volume of the fluid based on the height and diameter of the sample receptacle and the fluid level (e.g., the volume of the fluid is the volume of the entire sample receptacle minus the volume of the receptacle above the fluid level). If the shape of the bottom of the sample receptacle is other than flat, then the shape of the bottom of the receptacle is another physical characteristic that may be considered in determining the volume of the fluid in the sample receptacle.

In one aspect, the automated system may also comprise a respective sample receptacle holder for supporting the sample receptacle, such that an upper portion of the sample receptacle terminating at the rim is situated above the sample receptacle holder. The automated system may be configured to transport the sample receptacle holder (and any associated sample receptacle) within the automated system.

In additional features, the sample receptacle holder may include a recess configured to seat the closed bottom of the sample receptacle, and/or the sample receptacle may be a generally cylindrical puck with the recess being formed in a base of the puck. In another aspect, the receptacle holder may include a plurality of fingers extending upwardly from the puck, the fingers being configured to support the sample receptacle in a generally vertical orientation.

In still another aspect, the automated system also includes an automated conveyor configured to transport sample receptacle holders between respective stations of the system. For instance, the stations may include an analyzer configured to perform an analytical procedure with the fluid, such as a molecular assay or other suitable assay. In such case, the sensor may be configured to obtain the sequence of discrete surface distance measurements while the sample receptacle holder is supported by the conveyor.

In still another feature, the controller may be configured to also determine from the sensor output signal an orientation of the sample receptacle relative to the sample receptacle holder. For example, the sample receptacle may be tilted relative to the vertical axis of the sample receptacle holder. The orientation may include a tilt angle of the sample receptacle relative to the vertical axis of the sample receptacle holder. An excessive tilt angle may be an error condition, and the system may be configured to transport the sample receptacle from the sample receptacle holder to a quarantine area when the tilt angle is greater than a predetermined tilt angle.

In still another aspect, the sequence of discrete surface distance measurements may include (i) a plurality of distance measurements between the sensor and a first portion of the rim (first rim measurements), and (ii) a plurality of distance measurements between the sensor and a second portion of the rim (second rim measurements), and the controller may be configured to determine the tilt angle of the sample receptacle relative to the vertical axis of the sample receptacle holder from a difference between the first rim measurements and the second rim measurements.

In another aspect, the sequence of discrete measurements of distance includes a plurality of distance measurements between the sensor and the one or more surfaces of the sample receptacle, including multiple distance measurements between the sensor and the rim (referred to as "rim measurements"), and a plurality of distance measurements between the sensor and the surface of the fluid (referred to as "fluid measurements"). Further, the controller may be configured to utilize the multiple rim measurements and multiple fluid measurements to determine the fluid level in the sample receptacle relative to the rim. For example, the controller may be configured to determine an average rim distance based on the plurality of rim measurements, an average fluid distance based on the plurality of fluid measurements, and determine the fluid level as the difference between the average fluid distance and the average rim distance.

In still another aspect, the controller may be configured to identify which of the discrete surface distance measurements of the sequence of measurements are rim measurements and which measurements of the sequence of discrete surface distance measurements are fluid measurements. In one way, the controller is configured to identify one or more edges of the rim by analyzing a rate of change of the distances in the sequence of measurements. For example, the controller may identify the edges of the rim as measurements that correspond to peaks of the rate of change, and the measurements between the peaks are either rim measurements or fluid measurements. Alternatively, the controller may determine which of the measurements are rim measurements and which are fluid measurements by identifying the measurements where the rate of change of the distances in the sequence of measurements are within a threshold window (i.e., below a maximum absolute value).

In still another aspect, the controller may also be configured to determine which measurements in the sequence of measurements correspond to each of a first portion of the rim (i.e., rim measurements of first portion of rim), the top surface of the fluid, and a second portion of the rim (i.e., rim measurements of second portion of rim) opposite the first portion of the rim, respectively. The controller may utilize the edge finding techniques described above to make these determinations. Then, the controller may determine the fluid level based on averages of the rim measurements for the first portion of the rim, the rim measurements for the second portion of the rim, and the fluid measurements. In other words, the controller determines an average of the rim measurements for the first portion of the rim, an average the rim measurements for the second portion of the rim, and an average of the fluid measurements. The controller is further configured to determine the fluid level as the average of the average of the rim measurements for the first portion of rim and the average of the rim measurements for the second portion of rim, minus the average distance to top surface of the fluid.

In yet another aspect, the system may be configured to (i) transport the sample receptacle to a quarantine area when the level of the fluid contained within the sample receptacle relative to the rim is determined to be outside of a predetermined range or above a predetermined level, and (ii) release the sample receptacle for subsequent processing on the system, including performing an assay with the fluid, when the level of the fluid contained within the sample receptacle relative to the rim is determined to be within the predetermined range or below the predetermined level.

Another embodiment of this disclosure is directed to a method for detecting a level of a fluid sample contained in a sample receptacle. The sample receptacle has a closed bottom and a receptacle wall extending from the closed bottom to a rim defining an open top of the sample receptacle. The method may be performed on the automated system described herein, or other suitable system. The method includes periodically measuring a distance between a sensor and (i) one or more surfaces of the sample receptacle and (ii) a surface of the fluid contained within the sample receptacle while moving at least one of the sensor and the sample receptacle relative to the other to thereby obtain a sequence of discrete measurements of distances between (i) the sensor and the one or more surfaces of the sample receptacle, including measuring a distance between the sensor and the rim of the sample receptacle and (ii) the sensor and the surface of the fluid contained within the sample receptacle.

An output signal from the sensor comprising a digital representation of the sequence of discrete surface distance measurements is processed to thereby determine a level of the fluid contained within the sample receptacle relative to the rim of the sample receptacle (i.e., a fluid level or headspace).

In still another aspect of the method, the sensor may be mounted on a linear translator that moves the sensor relative to the sample receptacle for obtaining the sequence of discrete surface distance measurements. In another aspect, the sensor may be fixedly mounted relative to the sample receptacle, such that the sample receptacle moves relative to the sensor during the step of obtaining the sequence of measurements.

In another aspect, the method includes inserting the sample receptacle into a sample receptacle holder. The sample receptacle holder is configured to support the sample receptacle in a generally upright orientation, such that an upper portion of the receptacle wall terminating at the rim is situated above the sample receptacle holder.

In another aspect, the step of insetting the sample receptacle into the sample receptacle holder may include seating the closed bottom of the sample receptacle in a recess of the sample receptacle holder. The sample receptacle holder may be a generally cylindrical puck, and the recess may be formed in a base of the puck. In addition, the receptacle holder may further include a plurality of fingers extending upwardly from the puck, the fingers being configured to support the sample receptacle in a generally vertical orientation.

In still another aspect, the sample receptacle holder may be positioned on an automated conveyor during the step of inserting the sample receptacle into the sample receptacle holder. The conveyor may be configured to transport the sample receptacle holder between respective stations of a sample processing system. The stations may include an analyzer configured to perform an analytical procedure with the fluid, such as a molecular assay or other suitable assay. Furthermore, the sequence of measurements may be obtained while the sample receptacle holder is positioned on the automated conveyor.

In another aspect, prior to the step of inserting the sample receptacle into the sample receptacle holder, the method includes loading a receptacle rack holding the sample receptacle into an input station of the sample processing system, where the receptacle rack is configured to hold a plurality of sample receptacles. After loading the sample rack into the input station, the method may further include removing the sample receptacle from the sample receptacle rack with a gripper robot and performing the insertion step with the gripper robot. In still another aspect, the sensor may be disposed at the input station.

In yet another aspect, the step of processing the output signal also includes determining an orientation of the sample receptacle relative to the sample receptacle holder. For instance, the orientation may be a tilt angle of the sample receptacle relative to the vertical axis of the sample receptacle holder. In another feature, the method further includes transporting the sample receptacle to a quarantine area if the tilt angle is greater than a predetermined tilt angle.

In yet another aspect, the sequence of discrete surface distance measurements includes (i) a plurality of distance measurements between the sensor and a first portion of the rim (first rim measurements), and (ii) a plurality of distance measurements between the sensor and a second portion of the rim (second rim measurements), and the method may further include the step of determining the tilt angle of the sample receptacle relative to the vertical axis of the sample receptacle holder from a difference between the first rim measurements and the second rim measurements.

In another aspect of the method, the sensor is an ultrasound sensor.

In another aspect, the method further includes determining one or more physical characteristics of the sample receptacle. For example, the physical characteristics may include one or more of a height, a diameter, a shape and/or the presence or absence of a cap. In another aspect, the one or more physical characteristics are determined with a laser, an imaging device, and/or other suitable detector.

In still another aspect, the step of processing the output signal further includes determining a volume of the fluid contained within the sample receptacle based on the one or more physical characteristics of the sample receptacle and the level of the fluid contained within the sample receptacle.

In another aspect, the method also includes reading machine-readable indicia on the sample receptacle, typically while the sample receptacle is at a location for obtaining the sequence of discrete surface distance measurements.

In another aspect, the method further includes transporting the sample receptacle to a quarantine area when the level of the fluid contained within the sample receptacle is determined to be outside of a predetermined range or above a predetermined level. In addition, the method may also include releasing the sample receptacle for processing when the level of the fluid contained within the sample receptacle is determined to be within a predetermined range or below a predetermined level.

In another feature, the method includes, during the step of obtaining the sequence of surface distance measurements, adjusting a vertical position of the sensor using a vertical translator supporting the sensor to position the sensor within a predetermined distance or measuring range from the rim of the sample receptacle.

In another aspect of the method, the sequence of measurements is obtained by the sensor at a rate of 10-20 measurements per second. In another aspect, the sequence of measurements is obtained with the sensor and sample receptacle holder moving relative to one another at a rate of from 2.5 mm/second to 10 mm/second.

In another aspect, the method further includes, after the step of processing the output signal, transporting the sample receptacle to an analyzer, removing an aliquot of the fluid from the sample receptacle and transferring it to a reaction receptacle contained within the analyzer, and performing an analytical procedure with the aliquot of the fluid. The analytical procedure may be a molecular assay or other suitable assay. In another aspect, the sample receptacle may be a sample tube.

Accordingly, this disclosure provides automated systems and methods for processing a fluid sample in a sample receptacle to measure and determine one or more dimensional features of the fluid sample and sample receptacle, such as a fluid level, physical dimensions of the sample receptacle, and/or a volume of the fluid sample.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant:

FIG. 2A is side view of an exemplary sample receptacle in the form of a sample tube and a cap;

FIG. 2B is a cross-section of the sample receptacle of FIG. 2A;

DETAILED DESCRIPTION

Figure 1:
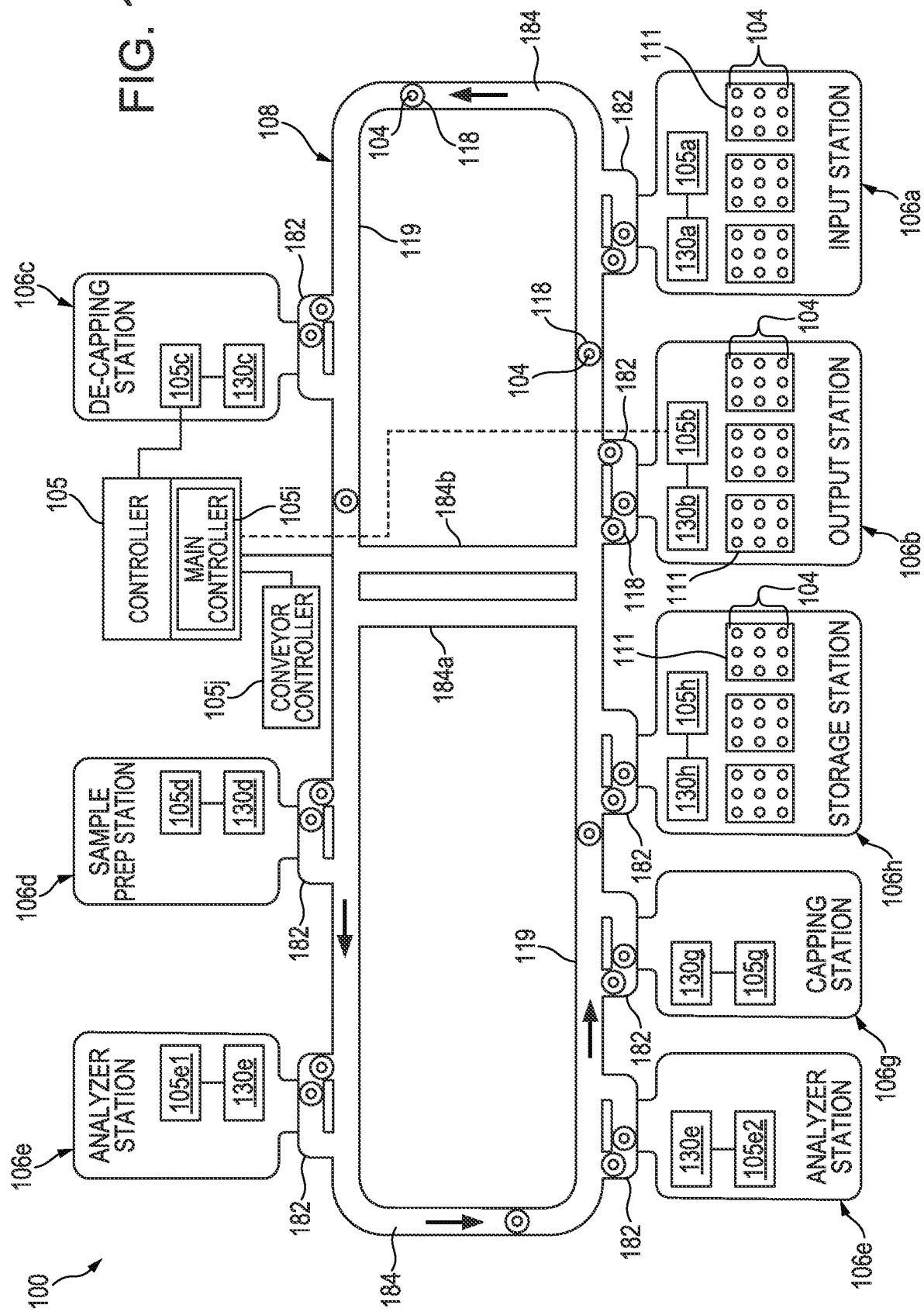
FIG. 1 is a schematic illustration of an exemplary automated system for processing fluid samples contained in sample receptacles.

Unless defined otherwise, all terms of art, notations and other scientific terms or terminology used herein have the same meaning as is commonly understood by one of ordinary skill in the art to which this disclosure belongs. All patents, applications, published applications and other publications referred to herein are incorporated by reference in their entirety. If a definition set forth in this disclosure is contrary to, or otherwise inconsistent with, a definition in these references, the definition set forth in this disclosure prevails over the definitions that are incorporated herein by reference. None of the references described or referenced herein is admitted to be prior art to the current disclosure.

References in the specification to "one embodiment," "an embodiment," a "further embodiment," "an example embodiment," "some aspects," "a further aspect," "aspects," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic is also a description in connection with other embodiments whether or not explicitly described. As used herein, "a" or "an" means "at least one" or "one or more."

As used herein, the term "sample" refers to any substance suspected of containing at least one analyte of interest. The analyte of interest may be, for example, a nucleic acid, a protein, a prion, a chemical, or the like. The substance may be derived from any source, including an animal, an industrial process, the environment, a water source, a food product, or a solid surface (e.g., surface in a medical facility). Substances obtained from animals may include, for example, blood or blood products, urine, mucous, sputum, saliva, semen, tears, pus, stool, nasopharyngeal or genitourinary specimen obtained with a swab or other collective device, and other bodily fluids or materials. The term "sample" will be understood to mean a specimen in its native form or to any stage of processing.

As used herein, the term "receptacle" refers to any type of fluid container, including, for example, a tube, vial, cuvette, cartridge, microliter plate, etc., that is configured to contain a sample or another fluid (collectively referred to herein as fluid). Non-limiting examples of exemplary receptacles include, for example, Aptima® urine specimen transport tube, Aptima® specimen transfer tube, BD Vacutainer®, etc.

As used herein, the term "gripper robot" refers to an electromechanical device, such as a pick-and-place device, that translates a receptacle in the X, Y, and/or Z directions.

As used herein, the term "conveyor" refers to a mechanical apparatus for transporting articles (e.g., receptacles) from one location to another along a defined path. Non-limiting examples of exemplary conveyors include robots, belts (such as, for example, a moving belt, a shuttle/carriage moving on a track, rail, belt, etc.), magnetic devices, gear systems, cable systems, vacuum systems, automated cars with wheels, etc.

As used herein, the term "assay" refers to a procedure for detecting and/or quantifying an analyte in a sample. A sample comprising or suspected of comprising the analyte is contacted with one or more reagents and subjected to conditions permissive for generating a detectable signal informative of whether the analyte is present or the amount (e.g., mass or concentration) of analyte in the sample.

As used herein, the term "analyzer" refers to an automated instrument that is capable of performing one or more steps of an assay, including the step of determining the presence or absence of one or more analytes suspected of being present in a fluid sample.

As used herein, the term "analyte" refers to a molecule present or suspected of being present in a sample and which is targeted for detection in an assay. Exemplary types of analytes include biological macromolecules such as nucleic acids, polypeptides, and prions.

As used herein, the term "molecular assay" refers to a procedure for specifically detecting and/or quantifying a target molecule, such as a target nucleic acid. A sample comprising or suspected of comprising the target molecule is contacted with one or more reagents, including at least one reagent specific for the target molecule, and subjected to conditions permissive for generating a detectable signal informative of whether the target molecule is present. For example, where the molecular assay is Polymerase Chain Reaction (PCR), the reagents include primers specific for the target and the generation of a detectable signal can be accomplished at least in part by providing a labeled probe that hybridizes to the amplicon produced by the primers in the presence of the target. Alternatively, the reagents can include an intercalating dye for detecting the formation of double-stranded nucleic acids.

As used herein, the term "reagent" refers to any substance or combination thereof that participates in a molecular assay, other than sample material and products of the assay. Exemplary reagents include nucleotides, enzymes, primers, probes, and salts.

FIG. 1 illustrates a schematic view of an automated system 100 for processing a fluid sample 102 (see FIG. 2) contained in a sample receptacle 104. In this exemplary embodiment, the automated system 100 is configured to process multiple sample receptacles 104. The automated system 100 includes a plurality of stations 106, including an input station 106a, an output station 106b, a decapping station 106c, a sample prep station 106d, one or more analyzer stations 106e (two analyzer stations 106e are illustrated, although any suitable number of analyzer stations 106e may be employed in the automated system 100, including only one), a capping station 106g, and a storage station 106h. The automated system 100 may have any different numbers and types of stations 106 suitable for the intended use of the system 100, including having more than one of each type of station 106. The automated system 100 also includes an automated conveyor system 108 which is configured to connect each of the stations 106 and to transport the sample receptacles 104 between the stations 106. Exemplary conveyor systems include those described in U.S. Pat. Nos. 9,766,258 and 9,776,811.

In the illustrated embodiment, the automated system 100 is configured to utilize sample tubes 104 (e.g., test tubes) as the sample receptacles 104. An exemplary sample tube 104 is shown in FIGS. 2A and 2B. The sample tube 104 is a cylindrical tube having a closed bottom 110, and a cylindrical receptacle wall 112 extending from the closed bottom 110 to a rim 114. The rim 114 defines an open top 116 of the sample tube 104. The sample tube 104 may have a threaded top portion 109 for attaching a cap 107 having mating threads. The sample receptacles 104 may be any suitable fluid sample receptacle having a closed bottom and a rim defining an open top. For instance, the sample receptacle 104 may be any other suitable fluid receptacle having a suitable shape and size. The sample tube 104 contains a fluid sample 102 having a top surface 103.

Figure 3:
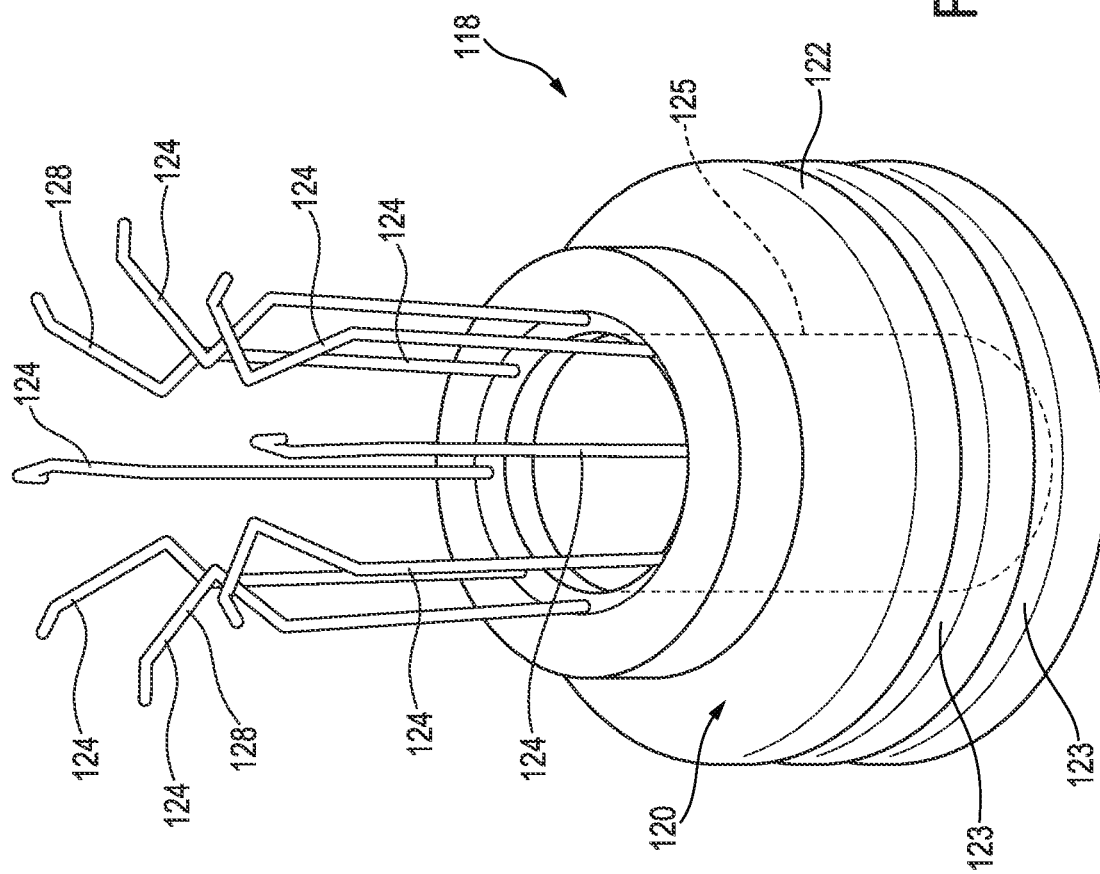
FIG. 3 is a perspective, front view of an exemplary sample receptacle holder.

The automated system 100 utilizes a sample receptacle holder 118 to hold and transport the sample receptacle 104 around system 100. FIG. 3 illustrates an exemplary sample receptacle holder 118. The sample receptacle holder 118 is in the form of a generally cylindrical puck 120 having a cylindrical base 122. An exemplary puck is described in U.S. Provisional Application No. 62/891,728 and U.S. patent application Ser. No. 17/003,754. The base 122 of the puck 120 has a recess 125 which seats the closed bottom 110 of the sample receptacle 104. The base 122 may also have one or more grooves 123 configured to receive and slide along a pair of opposed rails of a conveyor track 119. The puck 120 also has a plurality of fingers 124 extending upwardly from the base 122 which are configured to support the sample receptacle 104 in a vertical orientation. The fingers 124 are arranged in a circular pattern to match the cylindrical shape of the sample receptacle 104. The fingers 124 extend to a point below the rim 114 of the sample receptacle 104 such that an upper portion 126 of the sample receptacle 104, including the rim 114, is above the fingers 124 and exposed. Top portion 128 of the fingers 124 are tapered inwardly from the top to provide a guide while inserting a sample receptacle 104 between the fingers 124 of the puck 120. The tapered top portion 128 also aids in deflecting the fingers 124 when sample receptacles 104 are inserted into the sample receptacle holder 118. The input station 106a has a sample receptacle handling system 130a which is configured to remove sample receptacles 104 from a sample receptacle rack 111 supporting a plurality of sample receptacles 104 and to transfer them into respective sample receptacle holders 118.

The automated system 100 has a computerized controller 105 which controls the operation of each of the components in order to integrate and coordinate the components involved in processing the fluid sample 102 contained in the sample receptacle 104, including for example, determining a level of the fluid sample 102 in the sample receptacle 104, determining whether to quarantine the sample receptacle 104, and/or performing one or more analytical procedures on the fluid sample 102. The controller 105 may include a main controller 105i and one or more sub-system controllers. For example, each station 106 may have a corresponding sub-system controller 105 for controlling the respective station 106 and also coordinating with the main controller 105i and other sub-system controllers 105. Thus, the input station 106a has an input station controller 105a, the output station 106b has an output station controller 105b, the decapping station 106c has a decapping station controller 105c, the sample prep station 106d has a sample prep station controller 105d, the first analyzer station 106e has a first analyzer station controller 105e1, the second analyzer station 106e has a second analyzer station controller 105e2, the capping station 106g has a capping station controller 105g, the storage station has a storage station controller 105h, the conveyor system 108 has a conveyor controller 105j. The main controller 105i may be configured to address high level routing logic for each sample 102. In other words, it may only dictate a path or workflow through the system 100, such as a path including station 106a, station 106c, at least one station 106e, station 106g, and station 106h. The conveyor controller 105j may be configured to manage all the details on how to physically route each fluid sample 102 (and the sample receptacle 104 containing the respective fluid sample 102) to all the station 106 as dictated by main controller 105i. The individual controllers 105 within the stations 106, are at the lowest level and monitor and control all the components of the of respective stations, including sensors, motors and actuators, etc.

The stations 106 and conveyor system 108 are configured to handle and transport, the sample receptacle holder 118, and a sample receptacle 104 received in the sample receptacle holder 118 (referred to collectively as a loaded sample receptacle holder 118), around the automated system 100. The conveyor system 108 transports the loaded sample receptacle holder 118 between stations 106 of the automated system 100. The automated conveyor system 108 is controlled by the conveyor controller 105j.

The conveyor system 108 may be any apparatus for conveying or otherwise facilitating the transportation of loaded sample receptacle holders 118 between stations 106 along a defined path. In the illustrated embodiment, the conveyor system 108 includes a conveyor track 119, and the conveyor controller 105j. The conveyor system 108 uses the conveyor track 119, which includes a main conveyor line 184, a plurality of branch lines 182, respectively associated with each station 106, and one or more recirculation loops that includes return lines 184a, 184b. The conveyor system 108 may be formed of any other suitable conveyors, such as robots, belts (such as, for example, a moving belt, a shuttle/carriage moving on a track, rail, etc.), magnetic devices, gear systems, cable systems, vacuum systems, automated cars with wheels, or other systems for controllably transporting loaded sample receptacle holders 118 between the stations 106.

The main conveyor line 184 serves as the primary line for transporting the loaded sample receptacle holders 118 between the different stations 106 of the automated system 100. In the illustrated embodiment, the main conveyor line 184 has a closed geometric shape (e.g., rectangular) that facilitates unidirectional movement of the loaded sample receptacle holders 118. In alternative embodiments, the main conveyor line 184 may be linear and/or bidirectional.

Each of the branch lines 182 can be used as a buffer queue for receiving and queueing one or more loaded sample receptacle holders 118 to be processed at the particular station 106. The return lines 184a, 184b form closed inner loops which allow the loaded sample receptacle holders 118 to circulate while they await access to one or more of the stations 106. For example, if a branch line 182 of a station 106 has a full queue of loaded sample receptacle holders 118, a loaded sample receptacle holder 118 waiting to be processed at such station 106 may be circulated on inner loop 184a or 184b until the queue of the branch line 182 has available space.

The conveyor controller 105j is configured for controlling the functions of the conveyor system 108, such as transporting the loaded sample receptacle holders 118 between the stations 106 of the automated system 100. The main controller 105i may communicate with the conveyor controller 105j to instruct the conveyor controller 105j on the path each sample receptacle holder 118 is to be routed. Accordingly, the conveyor controller 105j may control the stations 106 to which the loaded sample receptacle holders 118 are transported and which stations 106 will be bypassed by the loaded sample receptacle holders 118. The conveyor controller 105j may communicate directly with each of the individual station controllers 105 to manage the workflow path of each sample receptacle holder 118.

Each station 106 is configured to receive, handle, and move the sample receptacle holder 118 and/or sample receptacle 104 within the respective station 106. For example, at least a portion of the stations 106 may include a respective sample receptacle handling system 130 for moving and/or manipulating the sample receptacle holders 118 and/or sample receptacles 104 within the respective stations 106.

The receptacle handling system 130 may include a gripper robot, such as a pick-and-place device, or other type of transporter(s).

Generally speaking, the input station 106a serves to receive and load sample receptacles 104 containing fluid samples 102 onto the automated system 100. The input station 106a is configured to be loaded with receptacle racks 111, each of which supports a plurality of sample receptacles 104 containing fluid samples 102, and to load the sample receptacles 104 onto the conveyor system 108. The receptacle racks 111 may be configured to hold any suitable number of sample receptacles 104, such as 50-500, 10-100, 10-50, etc., sample receptacles 104 per rack 111. The input station 106a is described in greater detail below.

Each analyzer station 106e is configured for processing the fluid samples 102 contained in the sample receptacles 104 by performing analytical tests on at least an aliquot of the specimens. Such tests may include molecular tests (e.g., nucleic acid-based assays), sequencing assays, immunoassays, chemical analyses, etc. Non-limiting examples of such analyzer stations 106e include automated analyzers such as, e.g., the TIGRIS®, PANTHER®, and PANTHER FUSION® systems sold by Hologic, Inc., Marlborough, Mass. In the illustrated embodiment, each analyzer station 106e may be configured for receiving sample receptacles 104 via automated loading (using the conveyor system 108) or manual loading through a sample bay (not shown). An example of automated loading of sample receptacles is described in U.S. Provisional Application No. 62/951,019.

The analyzer stations 106e may be specialized or redundant to allow higher throughput of analytical tasks on the fluid samples 102 contained in the sample receptacles 104. Typically, an analyzer station 106e extracts a liquid or liquified fluid sample 102 from a sample receptacle 104 and combines the fluid sample 102 with reagents in reaction vessels, such as cuvettes, tubes, vials, microtiter plates, etc., after which the vessels may be sealed, capped or otherwise closed. After combining the specimens with the reagents, the contents of the reaction vessels are subjected to a series of test conditions.

The sample prep station 106d is configured to prepare a fluid sample 102 contained in a sample receptacle 104 for testing in one or more of the analyzer stations 106e. For instance, the sample prep station 106d may be an aliquoting module configured for transferring a portion of fluid sample 102 from one type of sample receptacle (e.g., a receptacle having a different shape than sample receptacle 104) to another type of sample receptacle (e.g., sample receptacle 104) for use by at least one of the analyzer stations 106 to perform a test on the transferred fluid sample 102. An exemplary aliquoting module is described in U.S. Pat. No. 9,335,336. The sample prep station 106 may also combine a fluid sample 102 (or portion thereof) with reagents from another receptacle (e.g., a bulk reagent receptacle), in order to prepare the fluid sample 102 for testing in at least one of the analyzer stations 106. Thus, the sample prep station 106d may include one or more pipettors (not shown) that aspirate and dispense fluid sample 102 and/or reagents. A non-limiting example of a sample prep station 106d is the TOMCAT® instrument sold by Hologic, Inc., Marlborough, Mass.

The storage station 106h is configured to automatically load, store, and unload sample receptacles 104, for example, completed sample receptacles 104 (i.e., sample receptacles 104 containing fluid samples 102 for which the workflow has been completed), and/or sample receptacles 104 containing fluid samples 102 that are tested in low frequency until there are a sufficient number of such fluid samples 102 for testing. The storage station 106h is configured to handle and store a plurality of receptacle racks 111 (or other receptacle racks configured to hold a plurality of sample receptacles 104). Some racks 111 may be filled to capacity with sample receptacles 104, while others may have openings for receiving additional sample receptacles 104 to be stored in the storage station 106h. A sample receptacle handling system 130h of the storage station 106h is configured to transfer a sample receptacle 104 from sample receptacle holder 118 on the conveyor system 108 into a receptacle rack 111 within the storage system 106h in order to store such sample receptacle 104. The sample receptacle handling system 130h is also configured to transfer a stored sample receptacle 104 from a receptacle rack 111 within the storage system 106 into a sample receptacle holder 118 in order to load such sample receptacle 104 onto the conveyor system 108 for further processing. An exemplary storage station, as well as other features of an automated system for processing a fluid sample, are disclosed in U.S. Provisional Application No. 63/014,624, filed on Apr. 23, 2020. The decapping station 106c is configured for removing caps 107 from the sample receptacles 104 (one example is shown in FIG. 2A) prior to processing the fluid samples 102 contained therein. Examples of suitable decapping stations are described in U.S. Pat. Nos. 6,321,619 and 7,152,504. In the illustrated embodiment, the decapping station 106c is situated along the conveyor 108 before the sample prep station 106d and analyzer stations 106e. The decapping station 106c may be capable of removing different types of caps from capped sample receptacles 104 and, in some embodiments, the decapping station 106c may be capable of removing only a single type of cap 107 from the sample receptacles 104. In the latter case, multiple decapping stations 106c, each being capable of removing a different type of cap 107 from capped sample receptacles 104, may be provided along the conveyor system 108. In addition, the sample receptacles 104 may have pierceable caps (not shown), and such sample receptacles 104 may bypass or pass through the decapping station 106c and be transported directly to the sample prep station 106d and/or analyzer stations 106e for processing.

The capping station 106g is configured for installing caps 107 (e.g., replacement caps or stoppers) onto open-ended sample receptacles 104, for example, after extracting fluid samples from the sample receptacles 104 in the analyzer stations 106e. Examples of suitable capping stations are described in U.S. Pat. Nos. 6,321,619 and 7,152,504. In the illustrated embodiment, the capping station 106g is situated along the conveyor system 108 between the analyzer stations 106e on the one side and the storage station 106h and the output station 106b on the other side. The capping station 106g may be capable of installing different types of caps 107 to open-ended sample receptacles 104 and, in some embodiments, the capping station 106g may be capable of coupling only a single type of cap 107 to the open-ended sample receptacles 104. In the latter case, multiple capping stations 106g, each being capable of installing a different type of cap 107 to open-ended sample receptacles 104, may be provided along the conveyor system 108. Sample receptacles 104 may have pierceable caps (not shown) and such sample receptacles 104 may bypass or pass through the capping station 106g en route to the storage station 106h or the output station 106b.

The output station 106b is configured to receive sample receptacles 104 and remove them from the conveyor system 108. For example, the sample receptacles 104 may be unloaded after their fluid samples 102 have been processed on the automated system 100, or because the sample receptacle 104 is rejected, or for some other reason. The output station 106b is configured to use a sample receptacle handling system 130b of the output station 106b to remove sample receptacles 104 from their respective sample receptacle holders 118 on the conveyor system 108 and place the sample receptacles 104 into receptacle racks 111 (or other receptacle holders). Once the racks 111 are sufficiently filled with sample receptacles 104, the racks 111 may be removed from the output station 106, thereby removing the sample receptacles 104 from the automated system 100.

Figure 4:
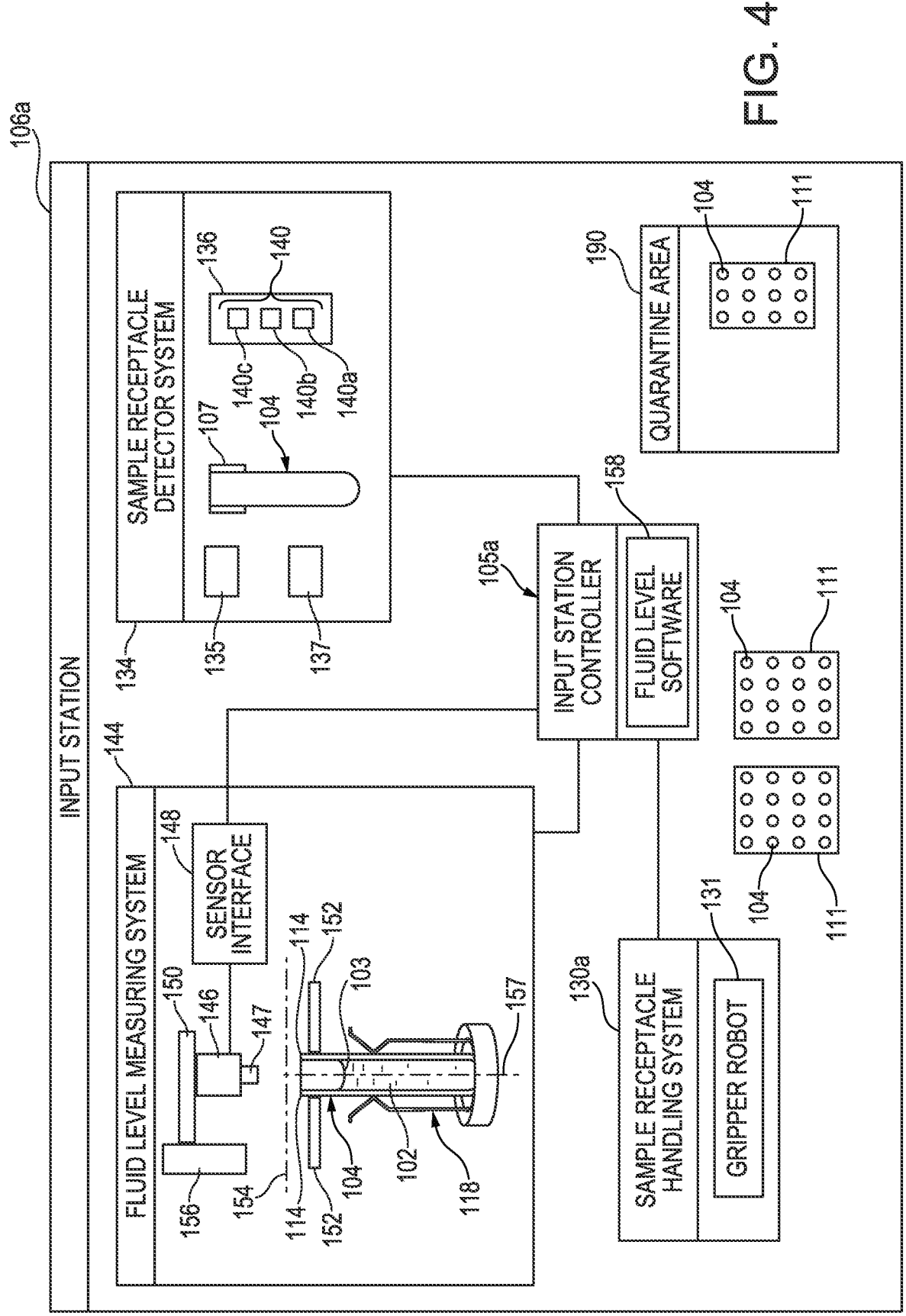
FIG. 4 is a schematic illustration of an exemplary input station of the automated system of FIG. 1.
Figure 5:
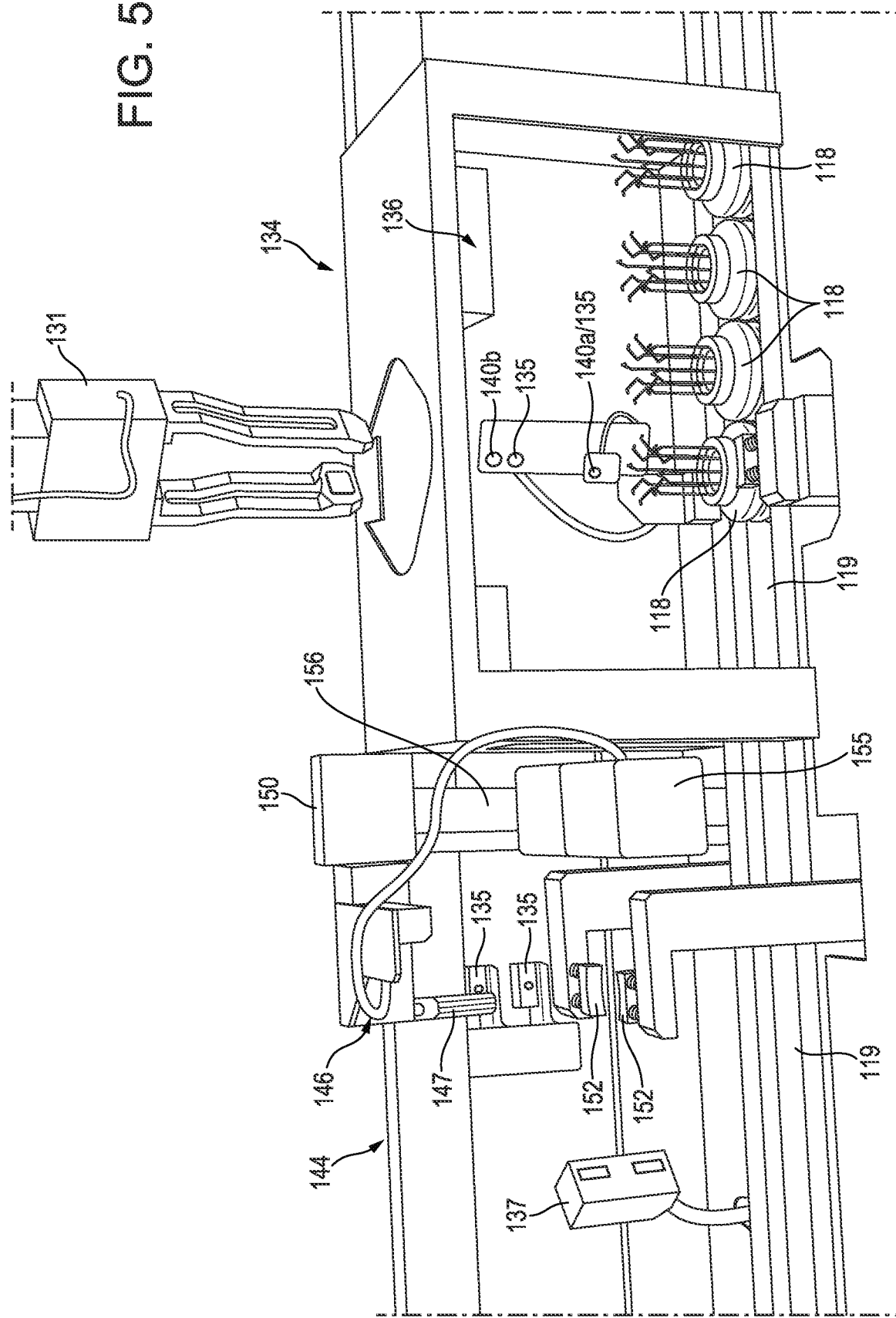
FIG. 5 is a back, perspective view of an exemplary input station identified in FIG. 1, showing a sample receptacle detector system and a fluid measuring system.
Figure 6:
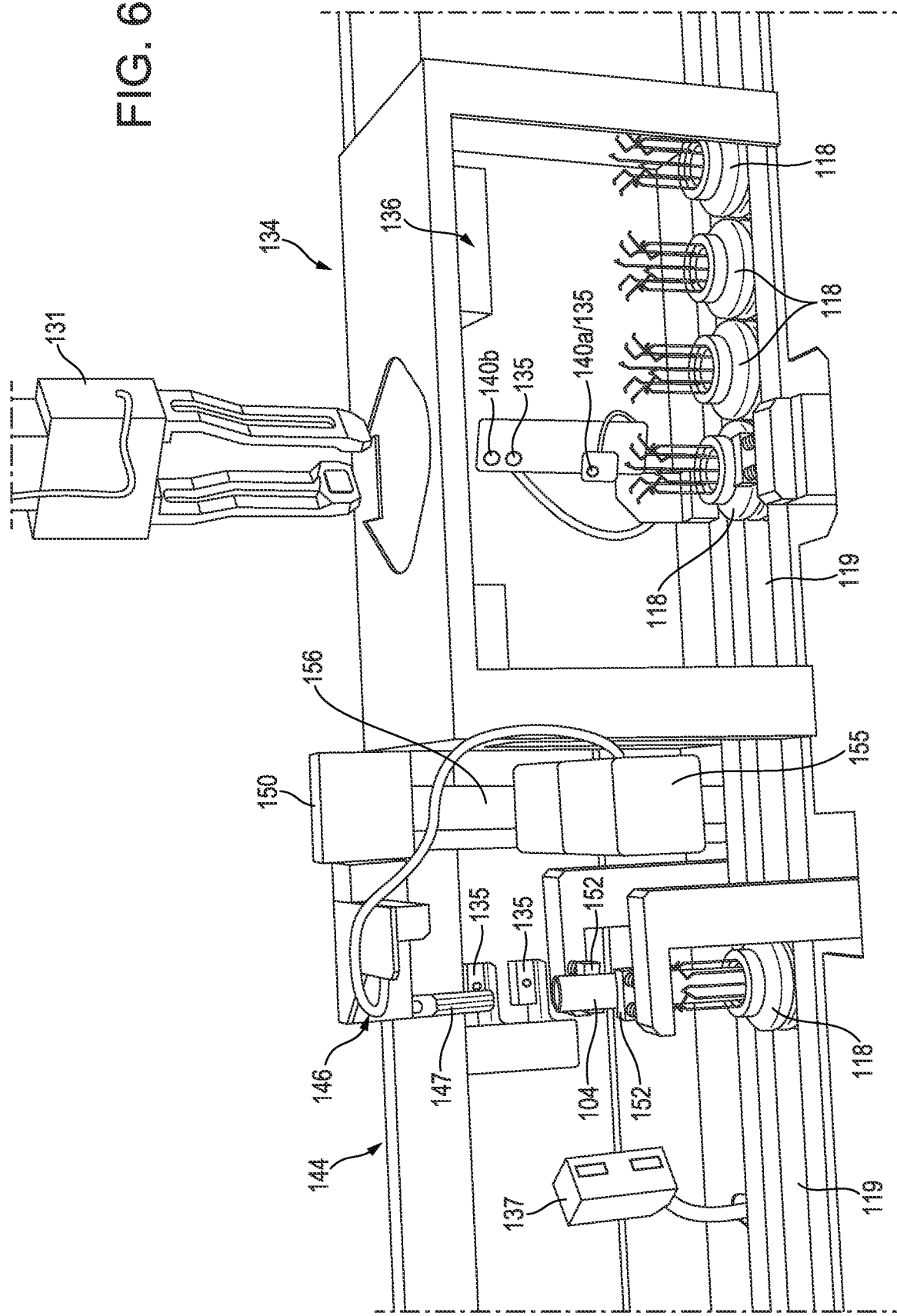
FIG. 6 is the back, perspective view of the input station of FIG. 5, showing a sample receptacle in the fluid measuring system.
Figure 7:
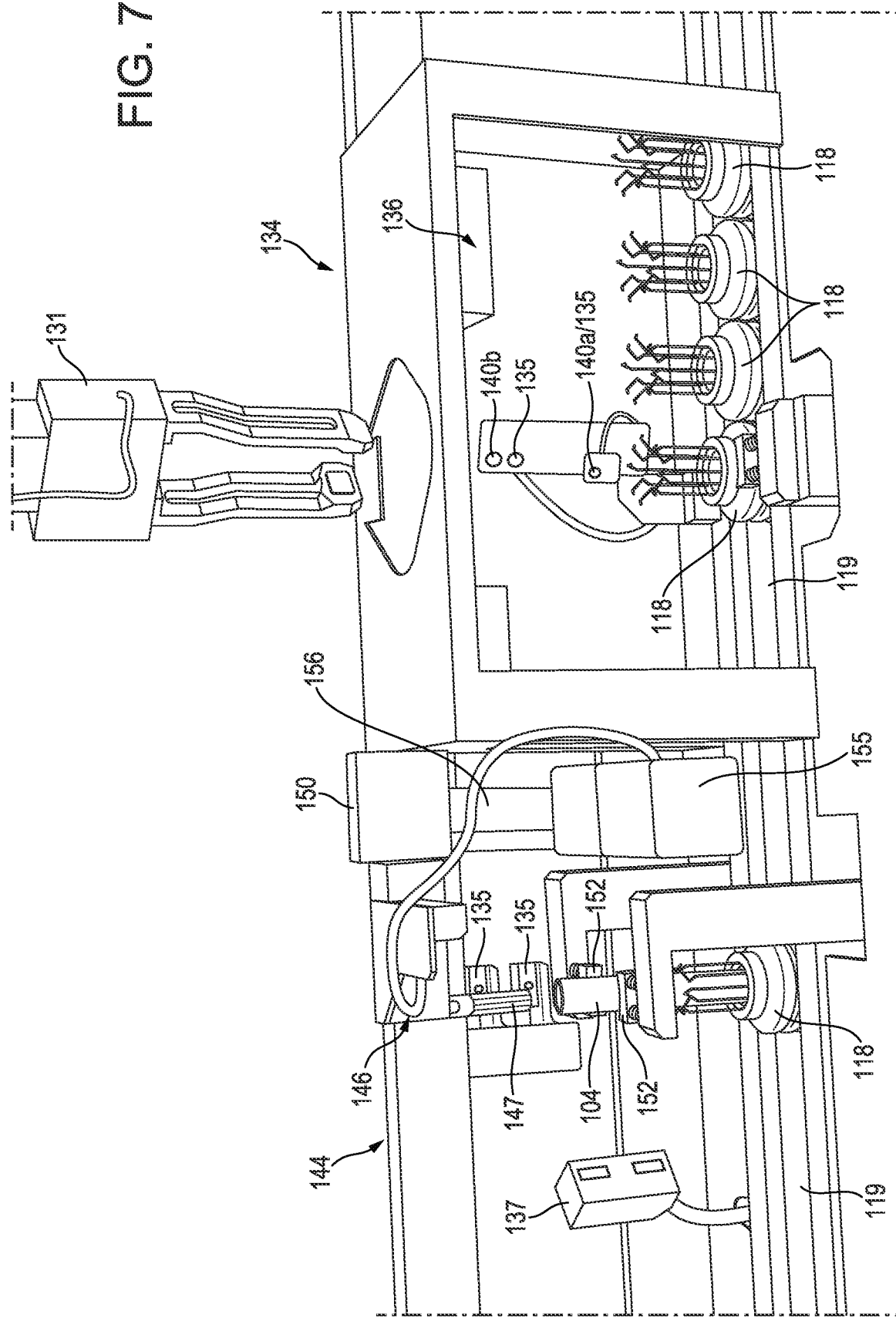
FIG. 7 is the back, perspective view of the input station of FIG. 6, showing a distance sensor of the fluid level measuring system in a position for taking distance measurements.

Referring to FIGS. 1, 4 and 5, the input station 106a will now be described in more detail. The input station 106a is configured to load sample receptacles 104 containing fluid samples 102 onto the automated system 100. In the illustrated embodiment, the sample receptacles 104 containing fluid samples 102 are loaded into receptacle racks 111 configured to hold a plurality of sample receptacles 104. The receptacle racks 111 may be configured to hold any suitable number of sample receptacles 104, such as 50-500, 10-100, 10-50, etc., sample receptacles 104 per rack 111. The receptacle racks 111 are loaded into the input station 106a (e.g., manually or using a robotic system, not shown). The input station 106a has an input station controller 105a which controls the operation of the input station 106a. Once a sample receptacle 104 is removed from a receptacle rack 111 in the input station 106a, it is inserted into a sample receptacle holder 118 in the sample receptacle detector system 134. The sample receptacle is characterized to determine sample receptacle characteristics for the sample receptacle 104 which are used to generate sample receptacle data. For example, the input station 106a may determine sample receptacle height, shape, diameter, bottom profile, head space (if uncapped), and barcode ID. The sample receptacle data may be transmitted to the conveyor controller 105j, which may convey the sample receptacle data up to the main controller 105i for instructions. The main controller 105i determines the open test orders for the sample receptacle 104, the main controller 105i may transmit routing instructions for the sample receptacle 104 to conveyor controller 105j.

The input station controller 105a is operably coupled to the components of the input station 106a in order to receive data signals for the components, process the data signals, and control the operation of the input station 106a based on the data signals.

The input station sample receptacle handling system 130a of the input station 106a includes a gripper robot 131 configured to remove the sample receptacles 104 from a receptacle rack 111 and insert each sample receptacle 104 into a respective sample receptacle holder 118. The gripper robot 131 may be any suitable robot for removing sample receptacles 104 from a receptacle rack 111 and inserting them into a sample receptacle holder 118, such as a pick-and-place robot, or the like.

As shown in FIGS. 4-7, the input station 106a has a sample receptacle detector system 134 configured to determine one or more physical characteristics of the sample receptacle 104. The sample receptacle detector system 134 includes one or more suitable detectors 136, which preferably include at least one high-resolution detector capable of submillimeter resolution. The at least one high-resolution detector 136 may be a wide laser measurement sensor (e.g., the ZX-GT Smart Sensor from OMRON® Corp.), a 2D laser profiler, an imaging device (e.g., a CCD sensor based camera or CMOS sensor camera), or a single point distance measurement sensor (e.g., the Confocal Displacement Sensor CL-3000 Series from KEYENCE). If the detector system 134 includes a high-resolution detector 136, then the high-resolution detector may be in addition to or in lieu of the array of light sensors 140. Unlike the array of light sensors 140, a high resolution detector 136 may be used to detect a shape of the sample receptacle 104 or to determine the dimensions of the sample receptacle 104.

The sample receptacle detector system 134 may be positioned and configured to detect physical characteristics of the sample receptacle 104 before the sample receptacle 104 is inserted into the sample receptacle holder 118 or after it is inserted into the sample receptacle holder 118. For instance, in the former case, the gripper robot 131 of input station 106a can retrieve the sample receptacle from a receptacle rack and move the sample receptacle 104 into a detection zone of the detector(s) 136, and the detector(s) 136 are activated to detect one or more physical characteristics of the sample receptacle 104. In the latter, the loaded sample receptacle holder 118 is moved into the detection zone of the detector(s) 136, and the detector(s) 136 are activated to detect one or more physical characteristics of the sample receptacle 104. As illustrated in FIG. 4, in one embodiment the detectors 136 include an array of light sensors 140 arranged in vertical alignment, and receptacle the sample receptacle 104 is placed in the detection zone of the array of light sensors 140 in order to detect a height of the sample receptacle 104. The light sensors 140a, 140b, and 140c may be reflective sensors with built-in emitter/receiver, reflective fiber optical sensors, or the like. The sample receptacle detector system 134 can determine a height of the sample receptacle 104, among several different expected heights, by determining which of light sensors 140a, 140b, and 140c are interrupted by a bottom portion of the sample receptacle 104 when the sample receptacle 104 is inserted into the detection zone of the array of light sensors 140.

By knowing the height of a sample receptacle 104, the corresponding volume capacity of the sample receptacle 104 can also be known. As an example, in order to determine the volume capacity of a sample receptacle 104 from three differently sized sample receptacles 104, the sample receptacle detector system 134 can distinguish between a large test tube (e.g., a 100 mL test tube), a medium test tube (e.g., a 75 mL test tube) and a small test tube (e.g., a 50 mL test tube). To do this, the sample receptacle detector system 134 determines which of the light sensors 140a, 140b, 140c is interrupted by the bottom portion of the sample receptacle 104 when the gripper robot 131 inserts the sample receptacle 104 into the detection zone of the array of light sensors 140. If the first light sensor 140a only is interrupted by the bottom portion of the sample receptacle 104, then the sample receptacle detector system 134 determines that the sample receptacle 104 is the small test tube. If light sensors 140a, 140b are interrupted by the bottom portion of the sample receptacle 104, and light sensor 140c is not interrupted, then the sample receptacle detector system 134 determines that the sample receptacle 104 is the medium test tube. And if all three light sensor 140a, 140b, 140c are interrupted by the bottom portion of the sample receptacle 104, then the sample receptacle detector system 134 determines that the sample receptacle 104 is the large test tube. The array of light sensors 140 can be configured to determine a size (i.e., volume capacity) of any desired number "n" of different size sample receptacles 104 by utilizing n−1 light sensors 140, where each size sample receptacle has a different length.

When a wide laser measurement sensor is employed as the detector(s) 136, the gripper robot 131 retrieves the sample receptacle 104 from a sample receptacle rack 111 located in the input station 106a, laterally moves the sample receptacle 104 to a position above the sample receptacle detector system 134, and then vertically lowers the sample receptacle 104 into the detection zone of the wide laser measurement sensor. While in the detection zone, the wide laser measurement sensor may detect the shape and/or determine the dimensions of the sample receptacle 104. The process is similar for an imaging device, except that the sample receptacle 104 is positioned within the field of view of the imaging device (e.g., camera), and the imaging device obtains an image of the sample receptacle 104. The sample receptacle detector system 134 analyzes the image and may determine the shape and/or dimensions of the sample receptacle 104. The sample receptacle detector system 134 can use information about the shape and/or dimensions of the sample receptacle 104 to determine the type of the sample receptacle 104 (e.g., 50 mL, 75 mL, or 100 mL tube), which is an indication of its volume capacity. The sample receptacle detector system 134 can also be used to determine other characteristics of a sample receptacle 104 filled with fluid sample 102, as described herein.

With single point distance measurement sensor, the sensor is scanned across the sample receptacle 104 to measure its diameter and/or any other features.

The sample receptacle detector system 134 may include one or more cap detectors 135 (the cap detectors 135 being positioned to detect caps 107 associated with sample receptacles 104 of different sizes) to determine the presence or absence of a cap by determining whether a sample tube 104 has a cap 107 secured to the open top 116 thereof. The cap detectors 135 may be reflective fiber optical sensors or other suitable sensor. The sample receptacle detector system 134 may also be configured to send an output signal representative of the cap status of the sample tube 104 to the controller 105.

The sample receptacle detector system 134 may also include a reader 137 configured to read machine-readable indicia 139 (see FIG. 2B), such as a barcode, machine-readable text, etc. on the sample receptacle 104. Alternatively, the reader 137 may be located on (or is otherwise associated with) a fluid level measuring system 144 of the input station 106a.

The fluid level measuring system 144 includes a distance sensor 146 configured to measure distance from the sensor to a feature. The distance sensor 146 may be an ultrasound sensor, such as the Series 9 ultrasonic sensors available from Baumer Electric AG, Hummelstrasse 17, 8501 Frauenfeld, Switzerland, a laser sensor, or other suitable sensor. The distance sensor 146, which may have a beam columnator 147, is oriented vertically downward and measures a vertical distance from the distance sensor 146 to a surface, such as the rim 114 of the sample receptacle 104 (known or determined not to have a cap secured to the open end 116 of the sample receptacle 104), the top surface 103 of the fluid sample 102, or other desired surface. The distance sensor 146 is highly accurate, preferably having a resolution of not more than 0.3 mm, and more preferably having a resolution of not more than 0.1 mm. This distance sensor 146 is also fast, preferably having a response time of not more than 10 milliseconds, more preferably having a response time of not more than 7 milliseconds, and even more preferably having a response time of not more than 5 milliseconds. Thus, the distance sensor 146 is capable of taking numerous measurements in a short period of time, including periodically measuring a distance to the measurement surfaces (i.e., the rim 114 of the sample receptacle 104 and the surface 103 of the fluid sample 102) as the distance sensor 146 is controllably moved relative to the sample receptacle 104, or the sample receptacle 104 is controllably moved relative to the distance sensor 146, to obtain a sequence of discrete measurements of distance between the distance sensor 146 and the measurement surface. For example, the sequence of measurements can be obtained by the distance sensor 146 at a rate of 10-20 measurements per second, 10-100 measurements per second, at least 10 measurements per second, or at least 50 measurements per second. The fast response time of the distance sensor 146 also allows the distance sensor 146 to be moved relative to the sample receptacle 104 at a relatively fast rate of from 2.5 mm/second to 10 mm/second, such that the distance sensor 146 can quickly obtain a sequence of measurements of the distances to the rim 114 and the fluid surface 103, such as in less than 10 seconds, less than 7.5 seconds, or less than 5 seconds.

The measurements may also be obtained by stopping the distance sensor 146 at specific locations as it is moved laterally over the sample receptacle 104, or as the sample receptacle 104 is moved laterally relative to the distance sensor 146. At each specific location, several distance measurements are taken and averaged. This process may be performed by scanning all or any portion of the sample receptacle 104 and the fluid surface 103 (e.g., obtaining a half profile) that is sufficient to calculate the headspace 117.

The fluid level measuring system 144 also includes a sensor interface 148 operably coupled to the distance sensor 146. The sensor interface 148 may be a digital or analog interface for communicating a representation of the surface distance measurements to the input station controller 105a. The distance sensor 146 and/or sensor interface 148 provide an output signal representative of the distance measurements which is received by the input station controller 105a and/or the main controller 105i. The output signal may be a digital representation or an analog representation.

In the embodiment of FIGS. 1, 4 and 5, the input station controller 105a is configured to controllably move the distance sensor 146 while the sample receptacle 104 (and/or corresponding sample receptacle holder 118) is stationary. In this embodiment, the distance sensor 146 is supported by a horizontal linear translator 150. The horizontal linear translator 150 may be a linear stage which controllably moves the distance sensor 146 relative to a stationary sample receptacle 104 and provides a horizontal stage position signal representing a horizontal position of the stage 150. Accordingly, the horizontal position of the distance sensor 146 may be determined from the horizontal stage position signal. The horizontal linear translator 150 is operably coupled to the input station controller 105a which controllably actuates the horizontal linear translator 150 and receives the horizontal stage position signal. The input station controller 105a is configured to process the horizontal stage position signal to determine a horizontal position of the distance sensor 146.

In order to precisely position and orient the sample receptacle 104 for performing a measurement scan of the sample receptacle 104 and fluid sample 102, the fluid level measuring system 144 may also include a receptacle clamp 152 configured to grasp the sample receptacle 104 and center the sample receptacle 104 in a measurement position. The receptacle clamp 152 positions a center of the sample receptacle 104 on a scanning axis 154 of the distance sensor 146 and horizontal linear translator 150. This ensures that the distance sensor 146 consistently measures the sample receptacles 104 along the center of the sample receptacles 104. For example, for sample tubes 104, as shown in FIGS. 2A-2B, the distance sensor 146 scans along a diameter of each sample tube 104. The receptacle clamp 152 is configured to orient the sample receptacle 104 vertically, such that a center axis 157 of the sample receptacle 104 is generally vertical during the measurement scan. Nevertheless, it is possible for the sample receptacle 104 to be tilted at an angle relative to vertical when it is received within the sample receptacle holder 118 should the receptacle clamp 152 improperly grasp (or not grasp) the sample receptacle 104. Because of this possibility, a measurement scan may be performed using the distance sensor 146 to (i) determine a level of fluid sample 102 relative to the rim 114 and/or (ii) determine a tilt angle of the sample receptacle 104, as describe herein.

The input station controller 105a is configured to operate the horizontal linear translator 150 to position and move the distance sensor 146 along the scanning axis 154 over one or more surfaces of the sample receptacle 104, including the rim 114, and the top surface 103 of the fluid sample 102. As the distance sensor 146 is moved, the controller receives a horizontal stage position signal representative of the position of the distance sensor 146. At the same time, the input station controller 105a operates the distance sensor 146 to obtain a sequence of discrete measurements between the distance sensor 146 and the one or more surfaces of the sample receptacle 104 and the top surface 103 of the fluid sample 102. The distance sensor 146 and/or sensor interface 148 outputs an output signal representative of the sequence of discrete measurements. The input station controller 105a receives and processes the horizontal stage position signal and output signal to determine a level of fluid sample 102 relative to the rim 114 of the sample receptacle 104, as further described herein.

The distance sensor 146 may also be supported by a vertical linear translator stage 156 that is operated by a stage motor 155 and moves the distance sensor 146 vertically relative to the sample receptacle 104. The vertical linear translator 156 adjusts the position of the distance sensor 146 so it is positioned within a distance measuring range of the distance sensor 146. For instance, the distance sensor 146 may have limitations on the distance from the measurement surface at which it can measure a distance or at which it is more accurate. As an example, the Series 9 ultrasonic sensors available from Baumer Electric AG have a measurement range from about 3 mm to about 150 mm. The vertical linear translator 156 may also be a linear stage which controllably moves the distance sensor 146 vertically relative to the stationary sample receptacle 104 and provides a vertical stage position signal representing a vertical position of the stage. Accordingly, the vertical position of the distance sensor 146 may be determined from the vertical stage position signal. The vertical linear translator 156 is operably coupled to the controller 105a which controllably actuates the vertical linear translator 156.

Hence, the vertical linear translator 156 allows the automated system 100 to accommodate different sized sample receptacles 104 by adjusting the vertical position of the distance sensor 146 to a pre-determined distance from the rim 114 of the sample receptacle 104. As described herein, the sample receptacle detector system 134 can determine the type, size and/or shape of the sample receptacle 104. Once the system 100 determines the characteristics of the sample receptacle 104 being measured, the vertical linear translator 156 may be operated to adjust the vertical position of the distance sensor 146 to a predetermined position which vertically positions the distance sensor 146 within the distance sensor's measurement range of the rim 114 of the sample receptacle 104, as well as the expected surface 103 of the fluid sample 102. In the above example regarding sample tubes 104 having heights of 100 mm and 75 mm, for example, the vertical linear translator is adjusted to position the distance sensor 146 lower for the 75 mm sample tube than for the 100 mm sample tube, since the bottom 110 of the sample receptacles 104 are seated at the same position (i.e., height relative to the conveyor track 119) in the recess 124 of their respective sample receptacle holders 118.

Alternatively, the distance sensor 146 may be mounted in a fixed horizontal position relative to the sample receptacle 104 and the sample receptacle 104 is moved relative to the distance sensor 146 in order to obtain the sequence of distance measurements. For instance, the sample receptacle 104 may be positioned on the conveyor system 108 and the conveyor system 108 moves the sample conveyor relative to the fixed distance sensor 146 while the distance sensor 146 obtains the sequence of distance measurements.

The sample receptacle detector system 134 is in communication with the input station controller 105a and sends output signals representative of the physical characteristics of the sample receptacle 104 to the input station controller 105a.

The input station controller 105a is configured to receive and process the output signals representative of the distance measurements from the fluid level measuring system 144 and determine a level of fluid 102 in a sample receptacle 104 relative to the rim 114. Although in the illustrated embodiment the input station controller 105a receives and processes the output signal of the fluid level measuring system 144, another controller 105, such as the main controller 105i, etc., may be configured to do so. The input station controller 105a has a fluid level software application 158 for analyzing the output signal of the distance measurements and determining a level of fluid 102 relative to the rim 114. Each of the distance measurements referred to herein is measured by the distance sensor 146, which provides an output signal representative of the distance between the measured feature and the distance sensor 146.

In one embodiment, the fluid level software application 158 is configured to determine the fluid level relative to the rim 114 by a difference of a distance measurement to the top surface 103 of the fluid 102 (referred to as a "fluid measurement") and a distance measurement to the rim 114 of the sample receptacle 104 (referred to as a "rim measurement").

Figure 8:
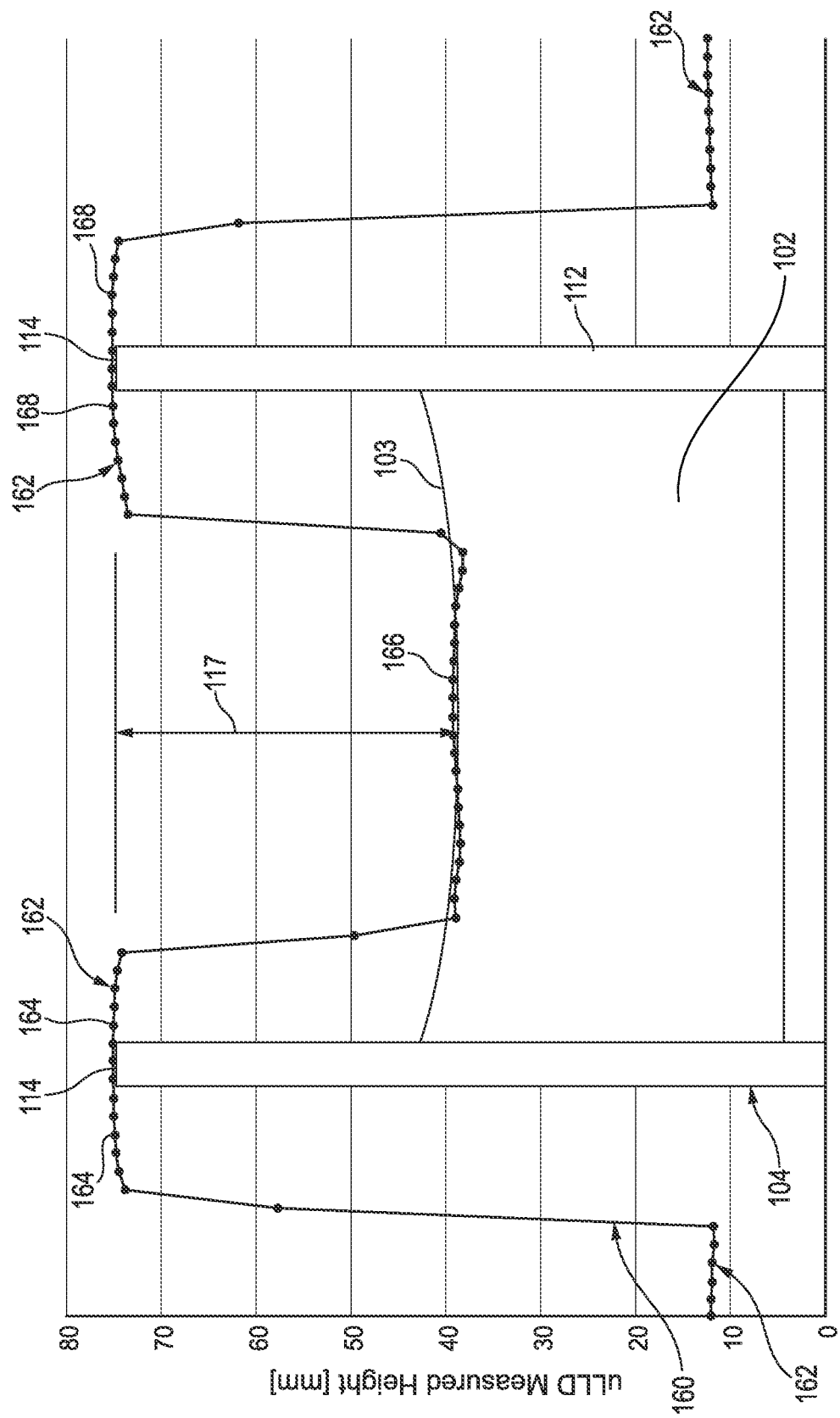
FIG. 8 is an illustration depicting a method for determining a fluid level relative to a rim of a sample receptacle using the automated system of FIG. 1, in an exemplary embodiment.

Referring to FIG. 8, in another embodiment, the fluid level software application 158 is configured to determine the fluid level relative to the rim 114 using an average of multiple fluid measurements and an average of multiple rim measurements. As described herein, the automated system 100 is configured to controllably move at least one of the distance sensor 146 or the sample receptacle 104 relative to the other while the distance sensor 146 periodically measures a distance between the sensor 146 and (i) one or more surfaces of the sample receptacle 104 and (ii) a surface 103 of a fluid 102 contained within the sample receptacle to obtain a sequence of discrete surface distance measurements including a plurality of fluid measurements (at different locations of the top surface 103) and a plurality of rim measurements (at different locations of the rim 114). The controller 105a receives the sequence of fluid measurements and rim measurements. Also, as the distance sensor 146 or sample receptacle 104 is moved relative to the other (or both the distance sensor 146 and the sample receptacle 104 move relative to each other), and the sequence of discrete measurements is being taken, the controller 105a is receiving the horizontal stage position signal and output signal of the distance sensor 146. The controller 105a associates each distance measurement to a sensor position such that the controller 105 is able to generate a distance measurement profile 160 of the measurements. FIG. 8 illustrates an exemplary distance measurement profile 160 which plots the distance measurement versus the measurement position. As shown in FIG. 8, the distance sensor 146 initiates scanning from a position to the left of the open top 116 of the sample receptacle 104 and takes a plurality of measurements 162. depicted at the left side of the profile 160. As the distance sensor 146 moves to the right relative to the sample receptacle 104 (the direction the distance sensor 146 moves is not critical), the distance sensor 146 takes a plurality of first rim measurements 164 for a first side of the rim 114. Moving further to the right, the distance sensor 146 takes a plurality of fluid measurements 166. Continuing to the right, the distance sensor 146 takes a plurality of second rim measurements 168 for the second side of the rim 114 opposite the first side of the rim 114.

The fluid level software application 158 is configured to determine the relative fluid level 117 (also referred to as relative fluid level 117 or "headspace 117") by determining an average of the first and second rim measurements 164, 168 and an average of the fluid measurements 166. The fluid level software application 158 determines the relative fluid level 117 as the fluid measurements average minus the rim measurements average.

It may be noted in FIG. 8 that the first rim measurements 164 actually begin to the left of the first side of the rim 114 and end to the right of the first side of the rim 114. Similarly, the second rim measurements 168 actually begin to the left of the second side of the rim 114 and end to the right of the second side of the rim 114. The fluid measurements 166 begin to the right of the far left edge of the fluid surface 103 and end to the left of the far right edge of the fluid surface 103. The reason that some of the data points of measurements 164, 168, 166 do not exactly coincide along the horizontal axis with the horizontal axis positions of the respective surfaces 114 and 103 is that the ultrasonic sensor emits sound waves that propagate from the sensor emitter in a conical form with an increasing diameter. Any surface entering the cone of sound waves will be interpreted by the sensor as an object and will be detected for a measurement. Accordingly, as shown in FIG. 8, as the sensor approaches the first and second sides of the rim 114 from the left, the rim will be detected by the sensor—and generate first rim measurements 164 and second rim measurements 168, respectively—before the horizontal axis position of the sensor actually coincides with the first or second side rim 114. As the sensor moves past the first and second sides of the rim 114 to the right, the rim will be detected by the sensor—and continue to generate first rim measurements 164 and second rim measurements 168, respectively—after the horizontal axis position of the sensor actually coincides with the first or second side rim 114.

Figure 9:
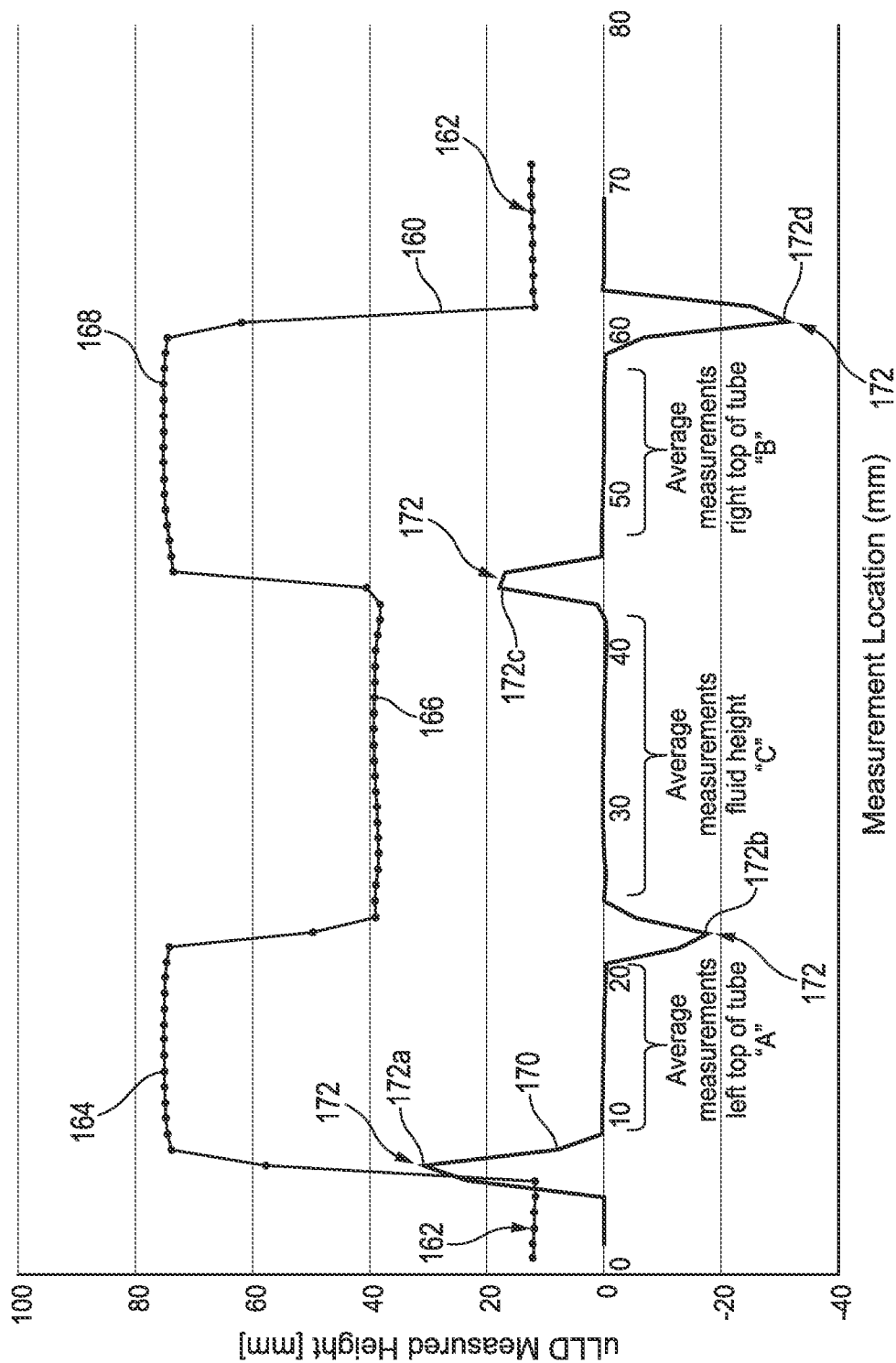
FIG. 9 is an illustration depicting an algorithm for determining a fluid level relative to a rim of a sample receptacle using the automated system of FIG. 1, in an exemplary embodiment.

The fluid level software application 158 may also be configured to identify whether the measurements in the sequence of discrete measurements are rim measurements or fluid measurements. FIG. 9 illustrates a derivative filtering method programmed into the fluid level software application 158. In this method, the fluid level software application 158 determines a rate of change 170 of the measurements in the sequence of discrete measurements (the derivative of the profile 160). The application 158 then identifies the peaks 172 of the rate of change 170. The peaks 172 identify the edges of the rim 114, such that the measurements between the first peak 172a and the second peak 172b correspond to the first rim measurements 164 for the first side of the rim 114. the measurements between the second peak 172b and the third peak 172c correspond to the fluid measurements 166, and the measurements between the third peak 172c and the fourth peak 172d correspond to the second rim measurement to the second side of the rim 114. As described above, the relative fluid level 117 is the difference of the average of the fluid measurements 166 and the average of the rim measurements 164, 168.

The relative fluid level 117 may also be determined using a faster scan and less measurement data by measuring only one of the first side of the rim 114 or the second side of the rim 114. In such a case, the relative fluid level 117 is the average of the fluid measurements 166 minus the average of the first rim measurements 164 or the average of the fluid measurements 166 minus the average of the second rim measurements 168.

Figure 10:
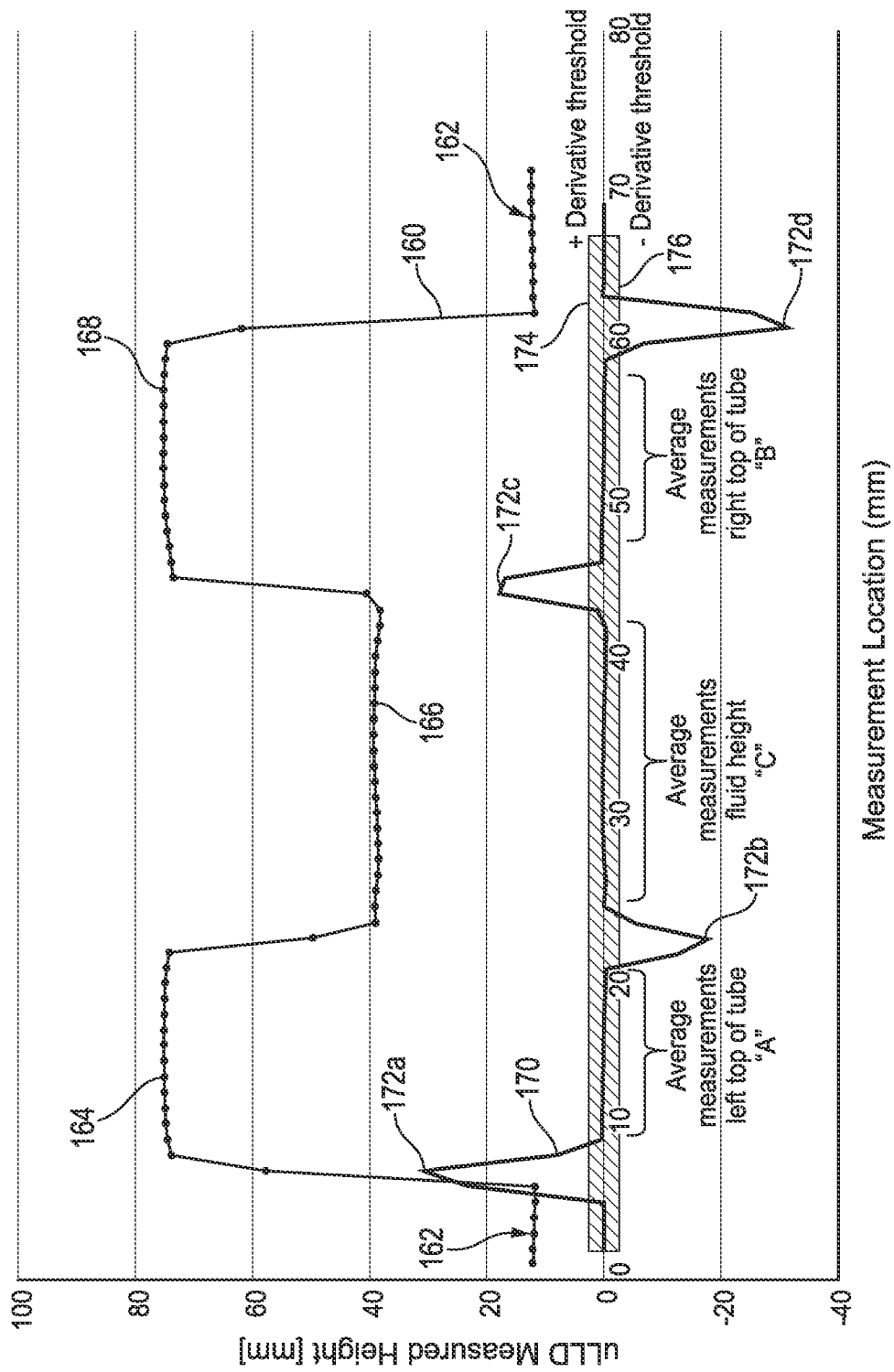
FIG. 10 is an illustration depicting an algorithm for determining a fluid level relative to a rim of a sample receptacle using the automated system of FIG. 1, in another exemplary embodiment.

FIG. 10 illustrates yet another algorithm for the fluid level software application 158 for determining whether the measurements in the sequence of discrete measurements are rim measurements or fluid measurements. This algorithm is similar to the algorithm depicted in FIG. 9, in that the fluid level software application 158 determines a rate of change 170 of the measurements in the sequence of discrete measurements (the derivative of the profile 160). The algorithm utilizes a predetermined positive derivative threshold 174 and a negative derivative threshold 176, and then determines which measurements 162 are between the positive derivative threshold 174 and the negative derivative threshold 176. Then, the algorithm determines which of these measurements between the thresholds 174 and 176 correspond to first rim measurements 164, fluid measurements 166, and second rim measurements 168 in the same manner as the algorithm of FIG. 9. In other words, the measurements between the first peak 172a and the second peak 172b, which are also between the thresholds 174 and 176, correspond to the first rim measurements 164 for the first side of the rim 114. The measurements between the second peak 172b and the third peak 172c, which are also between the thresholds 174 and 176, correspond to the fluid measurements 166. And the measurements between the third peak 172c and the fourth peak 172d, which are also between the thresholds 174 and 176, correspond to the second rim measurement to the second side of the rim 114. As described above, the relative fluid level 117 is then the difference of the average of the fluid measurements 166 and the average of the rim measurements 164, 168.

The fluid level software application 158 may also be configured to determine a tilt angle of the center axis 157 of the sample receptacle 104 relative to the vertical axis of the sample receptacle holder 118 based on the sequence of measurements. In one way, the software application 158 determines the difference between the height of the first side of the rim 114 and the height of the second side of the rim 114. In other words, the software application 158 determines the difference between (a) the distance between the distance sensor 146 and the first side of the rim 114 and (b) the distance between the distance sensor 146 and the second side of the rim 114. The software application 158 may determine this difference based on averages of the first rim measurements 164 and the averages of the second rim measurements 168 or other suitable methodology. The software application 158 may also determine which measurements are first rim measurements 164 and which measurements are second rim measurements 168 using the methods described above. The tilt angle of the center axis 157 of the sample receptacle 104 can be calculated based on the difference between the heights of the first side of the rim 114 and the second side of the rim 114 and the distance between the two heights (e.g. the diameter of the rim 114). Thus, as one example, the tilt angle of the center axis 157 from vertical may be calculated as the arc cos [(difference in height of first side of rim and second side of rim)/(diameter of rim)].

The input station controller 105a is further configured to determine if the relative fluid level 117 for a sample receptacle 104 is outside of a predetermined range or above a predetermined set level. The term "above" in this context means that the level of the fluid is higher than predetermined, programmed, or otherwise set level. Furthermore, the input station controller 105a, input station 106a, and/or automated system 100 may be configured to quarantine a sample receptacle 104 if the relative fluid level 117 for the sample receptacle 104 is determined to be outside of the a predetermined or above a predetermined level. For example, as shown in FIG. 4, the input station 106a has a quarantine area 190 in which the gripper robot 131 of the input station 106a places sample receptacles 104 needing to be quarantined. For instance, in order to reduce the risk of spilling or splashing of fluid sample 102 from a sample receptacle 104, which may contaminate other sample receptacles 104 or components of the system 100, a predetermined maximum level for the relative fluid level 117 may be set (i.e., a minimum headspace). If the input station controller 105a determines that the relative fluid level 117 for a sample receptacle 104 is above the maximum level, then the gripper robot 131 retrieves the sample receptacle 104 from the fluid measuring system 144 and places the sample receptacle 104 into a dedicated sample receptacle rack 111 positioned in the quarantine area 190 of the input station 106a. Similarly, a predetermined minimum level for the relative fluid level 117 may be set, for example, to ensure that there is sufficient fluid sample 102 in a sample receptacle 104 for processing on the automated system (e.g., run one or more tests on one or more of the analyzer stations 106e). If the input station controller 105a determines that the relative fluid level 117 for a sample receptacle 104 is below the minimum level, then the sample receptacle 104 can be moved to the dedicated sample receptacle rack 111 positioned in the quarantine area 190 in the same manner as the sample receptacle 104 having a relative fluid level 117 that exceeds the maximum level. The dedicated sample receptacle rack 111 may be positioned for manual removal from the quarantine area of the input station 106a.

The input station controller 106a may also be configured to release a sample receptacle 104 for processing on the automated system 100 when the relative fluid level 117 is determined to be within a predetermined range or below a predetermined level. For instance, the input station controller 105a may be configured to release a sample receptacle if it determines that the relative fluid level 117 is below a predetermined maximum level for the relative fluid level 117.

The input station controller 105a may also be configured to quarantine a sample receptacle if the tilt angle is determined to be outside of a predetermined range of tilt angles or above a predetermined tilt angle. For instance, the input station controller 105a may be programmed to quarantine a sample receptacle if the tilt angle is determined to be above 2°, above 5°, or above 10°.

The input station controller 105a may also be configured to release a sample receptacle if the tilt angle is determined to be within a predetermined range of tilt angles or above a predetermined tilt angle. For instance, the input station controller 105a may be programmed to release a sample receptacle 104 if the tilt angle is determined to be less than 2°, less than 5°, or less than 10°.

Embodiments

One or more of the following features and benefits may be encompassed by or achievable by embodiments described herein.

Embodiment 1. An automated system for detecting a level of a fluid contained in sample receptacle, the sample receptacle having a closed bottom and a receptacle wall extending from the closed bottom to a rim defining an open top of the sample receptacle, the system comprising: a sensor for periodically measuring a distance between the sensor and (i) one or more surfaces of the sample receptacle and (ii) a surface of a fluid contained within the sample receptacle, respectively, including measuring a distance between the sensor and the rim of the sample receptacle, wherein at least one of the sensor and sample receptacle is controllably movable relative to the other to enable the sensor to obtain a sequence of discrete surface distance measurements of distances between the sensor and (i) the one or more surfaces of the sample receptacle and (ii) the surface of the fluid contained within the sample receptacle; and a controller operatively coupled to the sensor and configured to receive and process an output signal from the sensor comprising a digital representation of the sequence of discrete surface distance measurements to thereby determine a level of the fluid contained within the sample receptacle relative to the rim of the sample receptacle.

Embodiment 2. The system of Embodiment 1, wherein the output signal further comprises sensor positions relative to the sample receptacle, wherein each sensor position is associated with one of the discrete surface distance measurements.

Embodiment 3. The system of Embodiment 1 or 2, wherein the sensor is supported by a linear translator that moves the sensor relative to the sample receptacle.

Embodiment 4. The system of Embodiment 1 or 2, wherein the sensor is fixedly mounted relative to the sample receptacle.

Embodiment 5. The system of Embodiment 1, wherein one or both of the sensor and the sample receptacle are controllably movable to perform a linear scan across the rim of the sample receptacle and the surface of the fluid, thereby permitting the sensor to obtain measurements at different locations on the rim and top surface of the fluid during the scan.

Embodiment 6. The system of Embodiment 5, wherein the linear scan utilizes continuous relative movement while the sensor obtains the measurements.

Embodiment 7. The system of Embodiment 5, wherein the linear scan utilizes intermittent relative movement, in which the movement is stopped intermittently for the sensor to obtain measurements.

Embodiment 8. The system of any one of Embodiments 1-7, wherein: the sensor is disposed at an input station for loading the sample receptacle onto the system; and the input station comprises a receptacle rack configured to hold a plurality of sample receptacles and a gripper robot configured to remove the sample receptacle from the rack.

Embodiment 9. The system of Embodiment 8, wherein the input station further comprises a detector system configured to determine one or more physical characteristics of the sample receptacle.

Embodiment 10. The system of Embodiment 9, wherein the one or more physical characteristics of the sample receptacle include at least one of a height, a diameter, a shape, and the presence or absence of a cap secured to a top end of the sample receptacle.

Embodiment 11. The system of Embodiment 9 or 10, wherein the detector system comprises at least one of a laser and an imaging device.

Embodiment 12. The system of any one of Embodiments 9-11, wherein the controller is further programmed to determine a volume of the fluid contained within the sample receptacle based on at least one of the one or more physical characteristics of the sample receptacle and the level of the fluid contained within the sample receptacle.

Embodiment 13. The system of any one of Embodiments 1-12, wherein the sensor is an ultrasound sensor.

Embodiment 14. The system of any one of Embodiments 1-13, wherein the sequence of discrete surface distance measurements includes (i) a plurality of distance measurements between the sensor and the one or more surfaces of the sample receptacle, including multiple distance measurements between the sensor and the rim (rim measurements), and (ii) a plurality of distance measurements between the sensor and the surface of the fluid (fluid measurements).

Embodiment 15. The system of Embodiment 14, wherein the controller is configured to determine the level of the fluid contained within the sample receptacle relative to the rim based on an average of the rim measurements and an average of the fluid measurements.

Embodiment 16. The system of any one of Embodiments 1-15, wherein the controller is configured to determine which measurements in the sequence of discrete surface distance measurements correspond to each of a first portion of the rim, the top surface of the fluid, and a second portion of the rim opposite the first portion of the rim.

Embodiment 17. The system Embodiment 16, wherein the controller is configured to determine which measurements in the sequence of discrete surface distance measurements correspond to each of the first portion of the rim, the top surface of the fluid, and the second portion of the rim opposite the first portion of the rim using an edge finding technique, wherein the edge finding technique comprises: (a) analyzing a rate of change of the distances in the sequence of discrete surface distance measurements, identifying the edges of the rim as measurements that correspond to peaks of the rate of change, and identifying the measurements between the peaks as either rim measurements or fluid measurements; or (b) identifying the measurements where the rate of change of the distances in the sequence of discrete surface distance measurements are within a threshold window.

Embodiment 18. The system of any one of Embodiments 1-17, further comprising a sample receptacle holder for supporting the sample receptacle, such that an upper portion of the receptacle wall terminating at the rim is situated above the sample receptacle holder;

Embodiment 19. The system of Embodiment 18, wherein the sample receptacle holder comprises a recess configured to seat the closed bottom of the sample receptacle.

Embodiment 20. The system of Embodiment 19, wherein the sample receptacle holder is a generally cylindrical puck, and wherein the recess is formed in a base of the puck.

Embodiment 21. The system of Embodiment 20, wherein the receptacle holder further comprises a plurality of fingers extending upwardly from the puck, the fingers being configured to support the sample receptacle in a generally vertical orientation.

Embodiment 22. The system of any one of Embodiments 18-21, further comprising an automated conveyor configured to transport the sample receptacle holder between respective stations of the system.

Embodiment 23. The system of Embodiment 22, wherein at least one of the stations is an analyzer configured to perform an analytical procedure with the fluid.

Embodiment 24. The system of Embodiment 23, wherein the analytical procedure is a molecular assay.

Embodiment 25. The system of any one of Embodiments 22-24, wherein the sensor is configured to obtain the sequence of discrete surface distance measurements while the sample receptacle holder is supported by the conveyor.

Embodiment 26. The system of any one of Embodiments 18-25, wherein the controller is further programmed to determine from the output signal an orientation of the sample receptacle relative to the sample receptacle holder.

Embodiment 27. The system of Embodiment 26, wherein the orientation comprises a tilt angle of the sample receptacle relative to the vertical axis of the sample receptacle holder.

Embodiment 28. The system of Embodiment 27, wherein the sequence of discrete surface distance measurements includes (i) a plurality of distance measurements between the sensor and a first portion of the rim (first rim measurements), and (ii) a plurality of distance measurements between the sensor and a second portion of the rim (second rim measurements), and wherein the controller is further programmed to determine the tilt angle of the sample receptacle relative to the vertical axis of the sample receptacle holder from a difference between the first rim measurements and the second rim measurements.

Embodiment 29. The system of Embodiment 27 or 28, wherein the system is configured to transport the sample receptacle from the sample receptacle holder to a quarantine area when the tilt angle is greater than a predetermined tilt angle.

Embodiment 30. The system of Embodiment 14 or 15, wherein the controller is configured to identify the discrete surface distance measurements as either rim measurements or fluid surface measurements by analyzing a rate of change of the measurements in the sequence of discrete surface distance measurements to find measurements corresponding to an edge of the rim.

Embodiment 31. The system of Embodiment 30, wherein the rate of change indicates an edge of the rim when the rate of change exceeds a threshold.

Embodiment 32. The system of any one of Embodiments 1-31, wherein the system is configured to (i) transport the sample receptacle to a quarantine area when the level of the fluid contained within the sample receptacle relative to the rim is determined to be outside of a predetermined range or above a predetermined level, and (ii) release the sample receptacle for subsequent processing on the system, including performing an assay with the fluid, when the level of the fluid contained within the sample receptacle relative to the rim is determined to be within the predetermined range or below the predetermined level.

Embodiment 33. The system of any one of Embodiments 1-32, wherein the sample receptacle is a test tube.

Embodiment 34. A method for detecting a level of a fluid contained in a sample receptacle, the sample receptacle having a closed bottom and a receptacle wall extending from the closed bottom to a rim defining an open top of the sample receptacle, the method comprising: (a) periodically measuring a distance between a sensor and (i) one or more surfaces of the sample receptacle supported by the sample receptacle holder and (ii) a surface of the fluid contained within the sample receptacle, respectively, including measuring a distance between the sensor and the rim of the sample receptacle, while moving at least one of the sensor and the sample receptacle holder relative to the other to thereby obtain a sequence of discrete surface distance measurements of distances between (i) the sensor and the one or more surfaces of the sample receptacle and (ii) the sensor and the surface of the fluid contained within the sample receptacle; and (b) processing an output signal from the sensor comprising a digital representation of the sequence of discrete surface distance measurements to thereby determine a level of the fluid contained within the sample receptacle relative to the rim of the sample receptacle.

Embodiment 35. The method of Embodiment 34, wherein the sensor is mounted on a linear translator that moves the sensor relative to the sample receptacle for obtaining the sequence of discrete surface distance measurements.

Embodiment 36. The method of Embodiment 34, wherein the sensor is fixedly mounted relative to the sample receptacle, and wherein the sample receptacle moves relative to the sensor during step (a).

Embodiment 37. The method of any one of Embodiments 34-36, further comprising: (c) prior to step (a), inserting the sample receptacle into a sample receptacle holder, the sample receptacle holder being configured to support the sample receptacle in a generally upright orientation, such that an upper portion of the receptacle wall terminating at the rim is situated above the sample receptacle holder.

Embodiment 38. The method of Embodiment 37, wherein step (c) comprises seating the closed bottom of the sample receptacle in a recess of the sample receptacle holder.

Embodiment 39. The method of Embodiment 37, wherein the sample receptacle holder is a generally cylindrical puck, and wherein the recess is formed in a base of the puck.

Embodiment 40. The method of Embodiment 39, wherein the receptacle holder further comprises a plurality of fingers extending upwardly from the puck, the fingers being configured to support the sample receptacle in a generally vertical orientation.

Embodiment 41. The method of any one of Embodiments 37-40, wherein the sample receptacle holder is positioned on an automated conveyor during step (a), the conveyor being configured to transport the sample receptacle holder between respective stations of a sample processing system.

Embodiment 42. The method of Embodiment 41, wherein at least one of the stations is an analyzer.

Embodiment 43. The method of Embodiment 42, wherein the analyzer is configured to perform a molecular assay with the fluid.

Embodiment 44. The method of any one of Embodiments 37-43, further comprising, prior to step (c), loading the sample receptacle into an input station of the sample processing system in a receptacle rack configured to hold a plurality of sample receptacles.

Embodiment 45. The method of Embodiment 44, further comprising removing the sample receptacle from the sample receptacle rack with a gripper robot and performing step (c) with the gripper robot.

Embodiment 46. The method of Embodiment 44 or 45, wherein the sensor is disposed at the input station.

Embodiment 47. The method of any one of Embodiments 34-46, wherein the sensor is an ultrasound sensor.

Embodiment 48. The method of any one of Embodiments 34-47, further comprising, prior to step (a), determining one or more physical characteristics of the sample receptacle.

Embodiment 49. The method of Embodiment 48, wherein the one or more physical characteristics of the sample receptacle include at least one of a height, a diameter, a shape and the presence or absence of a cap secured to a top end of the sample receptacle.

Embodiment 50. The system of Embodiment 48 or 49, wherein the one or more physical characteristics are determined with at least one of a laser and an imaging device.

Embodiment 51. The method of Embodiment 49 or 50, wherein processing the output signal further comprises determining a volume of the fluid contained within the sample receptacle based on the one or more physical characteristics of the sample receptacle and the level of the fluid contained within the sample receptacle.

Embodiment 52. The method of any one of Embodiments 34-51, further comprising reading machine-readable indicia on the sample receptacle while the sample receptacle is at a location for obtaining the sequence of discrete surface distance measurements.

Embodiment 53. The method of any one of Embodiments 34-52, further comprising transporting the sample receptacle to a quarantine area when the level of the fluid contained within the sample receptacle is determined to be outside of a predetermined range or above a predetermined level.

Embodiment 54. The method of any one of Embodiments 34-52, further comprising releasing the sample receptacle for processing when the level of the fluid contained within the sample receptacle is determined to be within a predetermined range or below a predetermined level.

Embodiment 55. The method of any one of Embodiments 34-54, further comprising, during step (a), adjusting a vertical position of the sensor using a vertical translator supporting the sensor to position the sensor within a predetermined measuring range of the rim of the sample receptacle.

Embodiment 56. The method of any one of Embodiments 34-55, wherein the sequence of discrete surface distance measurements is obtained by the sensor at a rate of 10-20 measurements per second.

Embodiment 57. The method of any one of Embodiments 34-56, wherein the sequence of discrete surface distance measurements includes (i) a plurality of distance measurements between the sensor and the one or more surfaces of the sample receptacle, including multiple distance measurements between the sensor and the rim (rim measurements), and (ii) a plurality of distance measurements between the sensor and the surface of the fluid (fluid measurements).

Embodiment 58. The method of Embodiment 57, wherein step (b) comprises determining the level of the fluid contained within the sample receptacle relative to the rim based on an average of the rim measurements and an average of the fluid measurements.

Embodiment 59. The method of any one of Embodiments 34-58, further comprising processing the output signal to determine which measurements in the sequence of discrete surface distance measurements correspond to each of a first portion of the rim, a top surface of the fluid, and a second portion of the rim opposite the first portion of the rim by: (a) analyzing a rate of change of the distances in the sequence of discrete surface distance measurements, identifying the edges of the rim as measurements that correspond to peaks of the rate of change, and identifying the measurements between the peaks as either rim measurements or fluid measurements; or (b) identifying the measurements where the rate of change of the distances in the sequence of discrete surface distance measurements are within a threshold window.

Embodiment 60. The method of any one of Embodiments 37-46, further comprising determining from the output signal an orientation of the sample receptacle relative to the sample receptacle holder.

Embodiment 61. The method of Embodiment 60, wherein the orientation comprises a tilt angle of the sample receptacle relative to the vertical axis of the sample receptacle holder.

Embodiment 62. The method of Embodiment 61, wherein the sequence of discrete surface distance measurements includes (i) a plurality of distance measurements between the sensor and a first portion of the rim (first rim measurements), and (ii) a plurality of distance measurements between the sensor and a second portion of the rim (second rim measurements), and wherein the method further comprises determining the tilt angle of the sample receptacle relative to the vertical axis of the sample receptacle holder from a difference between the first rim measurements and the second rim measurements.

Embodiment 63. The method of Embodiment 61 or 62, further comprising transporting the sample receptacle from the sample receptacle holder to a quarantine area when the tilt angle is greater than a predetermined tilt angle.

Embodiment 64. The method of any one of Embodiments 34-63, further comprising: after step (b), transporting the sample receptacle to an analyzer; removing an aliquot of the fluid from the sample receptacle and transferring it to a reaction receptacle contained within the analyzer; and performing an analytical procedure with the aliquot of the fluid.

Embodiment 65. The method of Embodiment 64, wherein the analytical procedure is a molecular assay.

Embodiment 66. The method of any one of Embodiments 34-65, wherein the sample receptacle is a sample tube.

Although particular embodiments have been shown and described, the above description is not intended to limit the scope of these embodiments. While embodiments and variations of the many aspects of the disclosure have been disclosed and described herein, such disclosure is provided for purposes of explanation and illustration only. Thus, various changes and modifications may be made without departing from the scope of the claims. For example, not all of the components described in the embodiments are necessary, and the disclosure may include any suitable combinations of the described components, and the general shapes and relative sizes of the components of the disclosure may be modified. Accordingly, embodiments are intended to exemplify alternatives, modifications, and equivalents that may fall within the scope of the claims. The disclosure, therefore, should not be limited, except to the following claims and their equivalents.

What is claimed is:
1. An automated system for detecting a level of a fluid contained in sample receptacle, the sample receptacle having a closed bottom and a receptacle wall extending from the closed bottom to a rim defining an open top of the sample receptacle, the system comprising:
a sensor for periodically measuring a distance between the sensor and (i) one or more surfaces of the sample receptacle and (ii) a surface of a fluid contained within the sample receptacle, respectively, including measuring a distance between the sensor and the rim of the sample receptacle, wherein at least one of the sensor and sample receptacle is controllably movable relative to the other to enable the sensor to obtain a sequence of discrete surface distance measurements of distances between the sensor and (i) the one or more surfaces of the sample receptacle and (ii) the surface of the fluid contained within the sample receptacle; and a controller operatively coupled to the sensor and configured to receive and process an output signal from the sensor comprising a digital representation of the sequence of discrete surface distance measurements to thereby determine a level of the fluid contained within the sample receptacle relative to the rim of the sample receptacle, wherein the controller is configured to determine which measurements in the sequence of discrete surface distance measurements correspond to each of a first portion of the rim, the top surface of the fluid, and a second portion of the rim opposite the first portion of the rim using an edge finding technique, wherein the edge finding technique comprises:

(a) analyzing a rate of change of the distances in the sequence of discrete surface distance measurements, identifying edges of the rim as measurements that correspond to peaks of the rate of change, and identifying the measurements between the peaks as either rim measurements or fluid measurements; or (b) identifying the measurements where the rate of change of the distances in the sequence of discrete surface distance measurements are within a threshold window.

2. The system of claim 1, wherein the output signal further comprises sensor positions relative to the sample receptacle, wherein each sensor position is associated with one of the discrete surface distance measurements.

3. The system of claim 1, wherein the sensor is supported by a linear translator that moves the sensor relative to the sample receptacle.

4. The system of claim 1, wherein the sensor is fixedly mounted relative to the sample receptacle.

5. The system of claim 1, wherein one or both of the sensor and the sample receptacle are controllably movable to perform a linear scan across the rim of the sample receptacle and the surface of the fluid, thereby permitting the sensor to obtain measurements at different locations on the rim and top surface of the fluid during the scan.

6. The system of claim 5, wherein the linear scan utilizes continuous relative movement while the sensor obtains the measurements.

7. The system of claim 5, wherein the linear scan utilizes intermittent relative movement, in which the movement is stopped intermittently for the sensor to obtain measurements.

8. The system of claim 1, wherein:
the sensor is disposed at an input station for loading the sample receptacle onto the system; and
the input station comprises a receptacle rack configured to hold a plurality of sample receptacles and a gripper robot configured to remove the sample receptacle from the rack.

9. The system of claim 8, wherein the input station further comprises a detector system configured to determine one or more physical characteristics of the sample receptacle, wherein the one or more physical characteristics of the sample receptacle include at least one of a height, a diameter, a shape, and the presence or absence of a cap secured to a top end of the sample receptacle, and wherein the detector system comprises at least one of a laser and an imaging device.

10. The system of claim 9, wherein the controller is further programmed to determine a volume of the fluid contained within the sample receptacle based on at least one of the one or more physical characteristics of the sample receptacle and the level of the fluid contained within the sample receptacle.

11. The system of claim 1, wherein the sequence of discrete surface distance measurements includes (i) a plurality of distance measurements between the sensor and the one or more surfaces of the sample receptacle, including multiple distance measurements between the sensor and the rim (rim measurements), and (ii) a plurality of distance measurements between the sensor and the surface of the fluid (fluid measurements).

12. The system of claim 11, wherein the controller is configured to determine the level of the fluid contained within the sample receptacle relative to the rim based on an average of the rim measurements and an average of the fluid measurements.

13. The system of claim 1, further comprising:
a sample receptacle holder for supporting the sample receptacle, such that an upper portion of the receptacle wall terminating at the rim is situated above the sample receptacle holder, wherein the receptacle holder is a generally cylindrical puck containing a recess configured to seat the closed bottom of the sample receptacle; and
an automated conveyor configured to transport the sample receptacle holder between respective stations of the system, wherein the sensor is configured to obtain the sequence of discrete surface distance measurements while the sample receptacle holder is supported by the conveyor.

14. The system of claim 13, wherein the controller is further programmed to determine from the output signal an orientation of the sample receptacle relative to the sample receptacle holder, and wherein the orientation comprises a tilt angle of the sample receptacle relative to the vertical axis of the sample receptacle holder.

15. The system of claim 14, wherein the sequence of discrete surface distance measurements includes (i) a plurality of distance measurements between the sensor and a first portion of the rim (first rim measurements), and (ii) a plurality of distance measurements between the sensor and a second portion of the rim (second rim measurements), and wherein the controller is further programmed to determine the tilt angle of the sample receptacle relative to the vertical axis of the sample receptacle holder from a difference between the first rim measurements and the second rim measurements.

16. The system of claim 15, wherein the system is configured to transport the sample receptacle from the sample receptacle holder to a quarantine area when the tilt angle is greater than a predetermined tilt angle.

17. The system of claim 1, wherein the system is configured to (i) transport the sample receptacle to a quarantine area when the level of the fluid contained within the sample receptacle relative to the rim is determined to be outside of a predetermined range or above a predetermined level, and (ii) release the sample receptacle for subsequent processing on the system, including performing an assay with the fluid, when the level of the fluid contained within the sample receptacle relative to the rim is determined to be within the predetermined range or below the predetermined level.

18. The system of claim 1, wherein the sensor is an ultrasound sensor.

19. An automated system for detecting a level of a fluid contained in sample receptacle, the sample receptacle having a closed bottom and a receptacle wall extending from the closed bottom to a rim defining an open top of the sample receptacle, the system comprising:
- a sensor for periodically measuring a distance between the sensor and (i) one or more surfaces of the sample receptacle and (ii) a surface of a fluid contained within the sample receptacle, respectively, including measuring a distance between the sensor and the rim of the sample receptacle, wherein at least one of the sensor and sample receptacle is controllably movable relative to the other to enable the sensor to obtain a sequence of discrete surface distance measurements of distances between the sensor and (i) the one or more surfaces of the sample receptacle and (ii) the surface of the fluid contained within the sample receptacle;
- a controller operatively coupled to the sensor and configured to receive and process an output signal from the sensor comprising a digital representation of the sequence of discrete surface distance measurements to thereby determine a level of the fluid contained within the sample receptacle relative to the rim of the sample receptacle;
- a sample receptacle holder for supporting the sample receptacle, such that an upper portion of the receptacle wall terminating at the rim is situated above the sample receptacle holder, wherein the receptacle holder is a generally cylindrical puck containing a recess configured to seat the closed bottom of the sample receptacle; and
- an automated conveyor configured to transport the sample receptacle holder between respective stations of the system, wherein the sensor is configured to obtain the sequence of discrete surface distance measurements while the sample receptacle holder is supported by the conveyor.

20. The system of claim 19, wherein the output signal further comprises sensor positions relative to the sample receptacle, wherein each sensor position is associated with one of the discrete surface distance measurements.

21. The system of claim 19, wherein the sensor is supported by a linear translator that moves the sensor relative to the sample receptacle.

22. The system of claim 19, wherein the sensor is fixedly mounted relative to the sample receptacle.

23. The system of claim 19, wherein one or both of the sensor and the sample receptacle are controllably movable to perform a linear scan across the rim of the sample receptacle and the surface of the fluid, thereby permitting the sensor to obtain measurements at different locations on the rim and top surface of the fluid during the scan.

24. The system of claim 23, wherein the linear scan utilizes continuous relative movement while the sensor obtains the measurements.

25. The system of claim 23, wherein the linear scan utilizes intermittent relative movement, in which the movement is stopped intermittently for the sensor to obtain measurements.

26. The system of claim 19, wherein:
- the sensor is disposed at an input station for loading the sample receptacle onto the system; and
- the input station comprises a receptacle rack configured to hold a plurality of sample receptacles and a gripper robot configured to remove the sample receptacle from the rack.

27. The system of claim 26, wherein the input station further comprises a detector system configured to determine one or more physical characteristics of the sample receptacle, wherein the one or more physical characteristics of the sample receptacle include at least one of a height, a diameter, a shape, and the presence or absence of a cap secured to a top end of the sample receptacle, and wherein the detector system comprises at least one of a laser and an imaging device.

28. The system of claim 27, wherein the controller is further programmed to determine a volume of the fluid contained within the sample receptacle based on at least one of the one or more physical characteristics of the sample receptacle and the level of the fluid contained within the sample receptacle.

29. The system of claim 19, wherein the sequence of discrete surface distance measurements includes (i) a plurality of distance measurements between the sensor and the one or more surfaces of the sample receptacle, including multiple distance measurements between the sensor and the rim (rim measurements), and (ii) a plurality of distance measurements between the sensor and the surface of the fluid (fluid measurements).

30. The system of claim 29, wherein the controller is configured to determine the level of the fluid contained within the sample receptacle relative to the rim based on an average of the rim measurements and an average of the fluid measurements.

31. The system of claim 19, wherein the controller is further programmed to determine from the output signal an orientation of the sample receptacle relative to the sample receptacle holder, and wherein the orientation comprises a tilt angle of the sample receptacle relative to the vertical axis of the sample receptacle holder.

32. The system of claim 31, wherein the sequence of discrete surface distance measurements includes (i) a plurality of distance measurements between the sensor and a first portion of the rim (first rim measurements), and (ii) a plurality of distance measurements between the sensor and a second portion of the rim (second rim measurements), and wherein the controller is further programmed to determine the tilt angle of the sample receptacle relative to the vertical axis of the sample receptacle holder from a difference between the first rim measurements and the second rim measurements.

33. The system of claim 32, wherein the system is configured to transport the sample receptacle from the sample receptacle holder to a quarantine area when the tilt angle is greater than a predetermined tilt angle.

34. The system of claim 19, wherein the system is configured to (i) transport the sample receptacle to a quarantine area when the level of the fluid contained within the sample receptacle relative to the rim is determined to be outside of a predetermined range or above a predetermined level, and (ii) release the sample receptacle for subsequent processing on the system, including performing an assay with the fluid, when the level of the fluid contained within the sample receptacle relative to the rim is determined to be within the predetermined range or below the predetermined level.

35. An automated system for detecting a level of a fluid contained in sample receptacle, the sample receptacle having a closed bottom and a receptacle wall extending from the closed bottom to a rim defining an open top of the sample receptacle, the system comprising:
- a sensor for periodically measuring a distance between the sensor and (i) one or more surfaces of the sample receptacle and (ii) a surface of a fluid contained within the sample receptacle, respectively, including measuring a distance between the sensor and the rim of the sample receptacle, wherein at least one of the sensor and sample receptacle is controllably movable relative to the other to enable the sensor to obtain a sequence of discrete surface distance measurements of distances between the sensor and (i) the one or more surfaces of the sample receptacle and (ii) the surface of the fluid contained within the sample receptacle; and a controller operatively coupled to the sensor and configured to receive and process an output signal from the sensor comprising a digital representation of the sequence of discrete surface distance measurements to thereby determine a level of the fluid contained within the sample receptacle relative to the rim of the sample receptacle, wherein the system is configured to (i) transport the sample receptacle to a quarantine area when the level of the fluid contained within the sample receptacle relative to the rim is determined to be outside of a predetermined range or above a predetermined level, and (ii) release the sample receptacle for subsequent processing on the system, including performing an assay with the fluid, when the level of the fluid contained within the sample receptacle relative to the rim is determined to be within the predetermined range or below the predetermined level.

* * * * *

UNITED STATES PATENT AND TRADEMARK OFFICE
CERTIFICATE OF CORRECTION

PATENT NO. : 12,442,830 B2
APPLICATION NO. : 17/996923
DATED : October 14, 2025
INVENTOR(S) : Rolf Silbert et al.

Page 1 of 1

It is certified that error appears in the above-identified patent and that said Letters Patent is hereby corrected as shown below:

On the Title Page

On Page 2, item (56), under "OTHER PUBLICATIONS", in Column 2, Line 12, delete "Aug," and insert -- Aug. --, therefor.

In the Specification

In Column 1, Line 54, delete "fluid-aspirating," and insert -- fluid-aspirating --, therefor.

In Column 6, Line 63, delete "average the" and insert -- average of the --, therefor.

In Column 7, Line 52, delete "insetting" and insert -- inserting --, therefor.

In Column 9, Line 33, delete "2A is" and insert -- 2A is a --, therefor.

In Column 10, Line 40, delete "or to" and insert -- or at --, therefor.

In Column 10, Line 43, delete "microliter" and insert -- microtiter --, therefor.

In Column 12, Line 66, delete "of the of" and insert -- of the --, therefor.

In Column 13, Line 2, delete "transport," and insert -- transport --, therefor.

In Column 20, Line 12, delete "describe" and insert -- described --, therefor.

In Column 22, Line 7, delete "162." and insert -- 162 --, therefor.

In Column 24, Line 15, delete "of the a" and insert -- of a --, therefor.

Signed and Sealed this
Twenty-seventh Day of January, 2026

John A. Squires
*Director of the United States Patent and Trademark Office*